United States Patent [19]

Myers et al.

[11] 4,419,223

[45] * Dec. 6, 1983

[54] CARBO-METALLIC OIL CONVERSION WITH WATER

[75] Inventors: George D. Myers; Lloyd E. Busch, both of Ashland, Ky.

[73] Assignee: Ashland Oil, Inc., Ashland, Ky.

[*] Notice: The portion of the term of this patent subsequent to Nov. 10, 1998 has been disclaimed.

[21] Appl. No.: 373,599

[22] Filed: Apr. 30, 1982

Related U.S. Application Data

[60] Continuation-in-part of Ser. No. 94,217, Nov. 14, 1979, Pat. No. 4,347,122, Continuation-in-part of Ser. No. 94,227, Nov. 14, 1979, Pat. No. 4,354,923, and a continuation-in-part of Ser. No. 319,570, Nov. 9, 1981, which is a division of Ser. No. 94,091, Nov. 14, 1979, Pat. No. 4,299,687.

[51] Int. Cl.³ .............................................. C10G 11/18
[52] U.S. Cl. ................................... 208/120; 208/113; 208/164; 208/251 R
[58] Field of Search ............ 208/113, 120, 164, 251 R

[56] References Cited

U.S. PATENT DOCUMENTS

| | | | |
|---|---|---|---|
| 2,427,112 | 9/1947 | Tyson | 208/159 |
| 2,575,258 | 11/1951 | Corneil et al. | 208/120 |
| 3,437,587 | 4/1969 | Ellert et al. | 208/120 |
| 3,471,412 | 10/1971 | Miale et al. | 208/111 X |
| 3,583,903 | 6/1971 | Miale et al. | 208/120 |
| 4,146,463 | 3/1979 | Radford et al. | 208/120 |
| 4,153,534 | 5/1979 | Vasalos | 208/120 |
| 4,162,213 | 9/1979 | Zrinscak et al. | 208/89 |
| 4,176,084 | 11/1979 | Luckenbach | 208/113 X |
| 4,243,514 | 1/1981 | Bartholic | 208/91 |
| 4,263,128 | 4/1981 | Bartholic | 208/91 |
| 4,289,605 | 9/1981 | Bartholic | 208/113 |
| 4,299,687 | 11/1981 | Myers et al. | 208/113 |
| 4,309,274 | 1/1982 | Bartholic | 208/80 |
| 4,311,579 | 1/1982 | Bartholic | 208/73 |
| 4,325,809 | 4/1982 | Bartholic | 208/91 |
| 4,325,817 | 4/1982 | Bartholic | 208/164 |
| 4,332,673 | 6/1982 | Myers | 208/120 |
| 4,347,122 | 8/1982 | Myers et al. | 208/113 |
| 4,354,923 | 10/1982 | Myers et al. | 208/113 |

OTHER PUBLICATIONS

Shankland and Schmitkons "Determination of Activity and Selectivity of Cracking Catalyst" Proc. API 27 (III) 1947, pp. 57–77.

Charles L. Hemler; Charles W. Strother; Bill E. McKay; and George D. Myers; "Catalytic Conversion of Residual Stocks", Mar. 25–27, 1979; Pertinent pp. 1–14 (entire paper).

Primary Examiner—Delbert E. Gantz
Assistant Examiner—G. E. Schmitkons
Attorney, Agent, or Firm—Willson, Jr., Richard C.

[57] ABSTRACT

A method is disclosed for cracking a carbo-metallic oil feed containing high amounts of coke forming carbonaceous materials as characterized by a carbon residue on pyrolysis of at least about 1 and by a level of heavy metal(s) of at least about 5.5 ppm by weight of Nickel Equivalents. The method includes contacting the feed with cracking catalyst bearing an accumulation of at least about 3,000 ppm by weight of Nickel Equivalents of heavy metal(s) and with additional material including water. The resultant stream flows through a progressive flow type reactor for a vapor residence time of about 0.5 to about 6 seconds at conditions sufficient for causing a conversion per pass of about 60% to about 90%. The additional material is added in a weight ratio relative to feed of up to about 0.4 and includes water in a weight ratio relative to feed of at least about 0.04. The water may be introduced as steam and/or liquid water. After such contact, catalyst is separated from product vapors and thereafter regenerated with oxygen-containing gas under conditions sufficient to reduce carbon on catalyst to about 0.25 percent by weight or less while maintaining a $CO:CO_2$ molar ratio of at least about 0.25 in combustion gases in heat exchange contact with the catalyst.

153 Claims, 2 Drawing Figures

CARBO-METALLIC OIL CONVERSION WITH WATER

RELATED APPLICATIONS

This is a continuation-in-part, of application Ser. No. 94,217, filed Nov. 14, 1979 now U.S. Pat. No. 4,347,122, a continuation-in-part of Ser. No. 94,227 filed Nov. 14, 1979 now U.S. Pat. No. 4,354,923 and a continuation-in-part of Ser. No. 319,570 filed Nov. 9, 1981, which in turn is a division of Ser. No. 94,091 filed Nov. 14, 1979 now U.S. Pat. No. 4,229,687.

BACKGROUND OF THE INVENTION

In general, gasoline and other liquid hydrocarbon fuels boil in the range of about 100° to about 650° F. However, the crude oil from which these fuels are made contains a diverse mixture of hydrocarbons and other compounds which vary widely in molecular weight and therefore boil over a wide range. For example, crude oils are known in which 30 to 60% or more of the total volume of oil is composed of compounds boiling at temperatures above 650° F. Among these are crudes in which about 10% to about 30% or more of the total volume consists of compounds so heavy in molecular weight that they boil above 1025° F. or at least will not boil below 1025° F. at atmospheric pressure.

Because these relatively abundant high boiling components of crude oil are unsuitable for inclusion in gasoline and other liquid hydrocarbon fuels, the petroleum refining industry has developed processes for cracking or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached a highly advanced state, and many modified forms and variations have been developed, their unifying factor is that a vaporized hydrocarbon feedstock is caused to crack at an elevated temperature in contact with a cracking catalyst that is suspended in the feedstock vapors. Upon attainment of the desired degree of molecular weight and boiling point reduction the catalyst is separated from the desired products.

Crude oil in the natural state contains a variety of materials which tend to have quite troublesome effects on FCC processes, and only a portion of these troublesome materials can be economically removed from the crude oil. Among these troublesome materials are coke precursors (such as asphaltenes, polynuclear aromatics, etc.), heavy metals (such as nickel, vanadium, iron, copper, etc.), lighter metals (such as sodium, potassium, etc.), sulfur, nitrogen and others. Certain of these, such as the lighter metals, can be economically removed by desalting operations, which are part of the normal procedure for pretreating crude oil for fluid catalytic cracking. Other materials, such as coke precursors, asphaltenes and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, the heavy metals can accumulate on the catalyst to the point that they unfavorably alter the composition of the catalyst and/or the nature of its effect upon the feedstock. For example, vanadium tends to form fluxes with certain components of commonly used FCC catalysts, lowering the melting point of portions of the catalyst particles sufficiently so that they begin to sinter and become ineffective cracking catalysts. Accumulations of vanadium and other heavy metals, especially nickel, also "poison" the catalyst. They tend in varying degrees to promote excessive dehydrogenation and aromatic condensation, resulting in excessive production of carbon and gases with consequent impairment of liquid fuel yield. An oil such as a crude or crude fraction or other oil that is particularly abundant in nickel and/or other metals exhibiting similar behavior, while containing relatively large quantities of coke precursors, is referred to herein as a carbo-metallic oil, and represents a particular challenge to the petroleum refiner.

In general the coke-forming tendency or coke precursor content of an oil can be ascertained by determining the weight percent of carbon remaining after a sample of that oil has been pyrolyzed. The industry accepts this value as a measure of the extent to which a given oil tends to form non-catalytic coke when employed as feedstock in a catalytic cracker. Two established tests are recognized, the Conradson Carbon and Ramsbottom Carbon tests, the latter being described in ASTM Test No. D524-76. In conventional FCC practice, Ramsbottom carbon values on the order of about 0.1 to about 1.0 are regarded as indicative of acceptable feed. The present invention is concerned with the use of hydrocarbon feedstocks which have higher Ramsbottom carbon values and thus exhibit substantially greater potential for coke formation than the usual feeds.

Since the various heavy metals are not of equal catalyst poisoning activity, it is convenient to express the poisoning activity of an oil containing a given poisoning metal or metals in terms of the amount of a single metal which is estimated to have equivalent poisoning activity. Thus, the heavy metals content of an oil can be expressed by the following formula (patterned after that of W. L. Nelson in *Oil and Gas Journal*, page 143, Oct. 23, 1961) in which the content of each metal present is expressed in parts per million of such metal, as metal, on a weight basis, based on the weight of feed:

$$\text{Nickel Equivalents} = \text{Ni} + \frac{V}{4.8} + \frac{Fe}{7.1} + \frac{Cu}{1.23}$$

According to conventional FCC practice, the heavy metal content of feedstock for FCC processing is controlled at a relatively low level, e.g. about 0.25 ppm Nickel Equivalents or less. The present invention is concerned with the processing of feedstocks containing metals substantially in excess of this value, and which therefore have a significantly greater potential for accumulating on and poisoning catalyst.

The above formula can also be employed as a measure of the accumulation of heavy metals on cracking catalyst, except that the quantity of metal employed in the formula is based on the weight of catalyst (moisture free basis) instead of the weight of feed. In conventional FCC practice, in which a circulating inventory of catalyst is used again and again in the processing of fresh feed, with periodic or continuing minor addition and withdrawal of fresh and spent catalyst, the metal content of the catalyst is maintained at a level which may for example be in the range of about 200 to about 600 ppm Nickel Equivalents. The process of the present invention is concerned with the use of catalyst having a substantially larger metals content, and which therefore has a much greater than normal tendency to promote dehydrogenation, aromatic condensation, gas production or coke formation. Therefore, such higher metals accumulation is normally regarded as quite undesirable in FCC processing.

There has been a long standing interest in the conversion of carbo-metallic oils into gasoline and other liquid fuels. For example, in the 1950s it was suggested that a variety of carbo-metallic oils could be successfully converted to gasoline and other products in the Houdresid process. Turning from the FCC mode of operation, the Houdresid process employed catalyst particles of "granular size" (much larger than conventional FCC catalyst particle size) in a compact gravitating bed, rather than suspending catalyst particles in feed and product vapors in a fluidized bed. The productivity of the process, compared to fluid catalytic cracking with lighter gas oils, was low. But the Houdresid process did offer some advantages. It appeared that the adverse effects previously encountered with heavy metals in the feed were not as great a barrier in the Houdresid process as one might expect in FCC processing. The heavy metal which accumulated on or near the outer surfaces of the catalyst particles apparently could be removed to some extent by an attrition process, which selectively removed an outer layer of metal-contaminated catalyst. The catalysts were very cheap, but also relatively inactive, highly unsuitable by today's standards. While the maximum tolerable limit of heavy metal contamination on catalyst in fluid catalytic cracking was then thought to be about 200 parts per million, the Houdresid process did continue to operate satisfactorily even when the total nickel plus vanadium content of the catalyst had reached 870 ppm. Moreover, it was found that the required levels of selectivity could be maintained without withdrawing catalyst from the process, except to the extent that withdrawal was required by normal mechanical losses (e.g. attrition and inadvertent discharge with off gases) and by the attrition used to control metals level. Today such attrition of catalyst to fine particulates would present an expensive environment problem, thus considerably increasing difficulties involved in practicing the process.

Although the Houdresid process obviously represented a step forward in dealing with the effects of metal contamination and coke formation on catalyst performance, its productivity was limited. Because its operation was uneconomical, the first Houdresid unit is no longer operating. Thus, for the 25 years which have passed since the Houdresid process was first introduced commercially, the art has continued its arduous search for suitable modifications or alternatives to the FCC process which would permit commercially successful operation on reduced crude and the like. During this period a number of proposals have been made; some have been used commercially to a certain extent.

Several proposals involve treating the heavy oil feed to remove the metal therefrom prior to cracking, such as by hydrotreating solvent extraction and complexing with Friedel-Crafts catalysts, but these techniques have been criticized as unjustified economically. Another proposal employs a combination cracking process having "dirty oil" and "clean oil" units. Still another proposal blends residual oil with gas oil and controls the quantity of residual oil in the mixture in relation to the equilibrium flash vaporization temperature at the bottom of the riser type cracker unit employed in the process. Still another proposal subjects the feed to a mild preliminary hydrocracking or hydrotreating operation before it is introduced into the cracking unit. It has also been suggested to contact a carbo-metallic oil such as reduced crude with hot taconite pellets to produce gasoline. This is a small sampling of the many proposals which have appeared in the patent literature and technical reports.

Notwithstanding the great effort which has been expended and the fact that each of these proposals overcomes some of the difficulties involved, conventional FCC practice today bears mute testimony to the dearth of carbo-metallic oil-cracking techniques that are both economical and highly practical in terms of technical feasibility. Some crude oils are relatively free of coke precursors or heavy metals or both, and the troublesome components of crude oil are for the most part concentrated in the highest boiling fractions. Accordingly, it has been possible to largely avoid the problems of coke precursors and heavy metals by sacrificing the liquid fuel yield which would be potentially available from the highest boiling fractions. More particularly, conventional FCC practice has employed as feedstock that fraction of crude oil which boils at about 650° F. to about 1000° F., such fractions being relatively free of coke precursors and heavy metal contamination. Such feedstock, known as "vacuum gas oil" (VGO) is generally prepared from crude oil by distilling off the fractions boiling below about 650° F. at atmospheric pressure and then separating by further vacuum distillation from the heavier fractions a cut boiling between about 650° F. and about 900° to 1025° F.

The vacuum gas oil is used as feedstock for conventional FCC processing. The heavier fractions are normally employed for a variety of other purposes, such as for instance production of asphalt, residual fuel oil, #6 fuel oil, or marine Bunker C fuel oil, which represents a great waste of the potential value of this portion of the crude oil, especially in light of the great effort and expense which the art has been willing to expend in the attempt to produce generally similar materials from coal and shale oils. The present invention is aimed at the simultaneous cracking of these heavier fractions containing substantial quantities of both coke precursors and heavy metals, and possibly other troublesome components, in conjunction with the lighter oils, thereby increasing the overall yield of gasoline and other hydrocarbon liquid fuels from a given quantity of crude. As indicated above, the present invention by no means constitutes the first attempt to develop such a process, but the long standing recognition of the desirability of cracking carbo-metallic feedstocks, along with the slow progress of the industry toward doing so, show the continuing need for such a process. It is believed that the present process is uniquely advantageous for dealing with the problem of treating such carbo-metallic oils in an economically and technically sound manner.

SUMMARY OF THE INVENTION

The present invention is notable in providing a simple, relatively straightened and higly productive approach to the conversion of carbo-metallic feed such as reduced crude or the like to various lighter products such as gasoline. The carbo-metallic feed comprises or is composed of oil which boils above about 650° F. This oil, hereinafter sometimes referred to as converter feed, preferably contains at least about 70% by volume of 650° F.+ material, preferably includes at least about 10% by volume of material which will not boil below about 1000° F., preferably about 1025° F., and may have had substantially no prior hydrotreatment. Such oil, or at least the 650° F.+ portion thereof, is characterized by a heavy metal content of at least about 5.5 ppm of Nickel Equivalents by weight and by a carbon residue on pyrolysis of at least about 1% and more preferably at least about 2% or 4% weight.

In accordance with the invention, the carbo-metallic feed, in the form of a pumpable liquid, is brought into contact with hot conversion catalyst in a weight ratio of catalyst to feed in the range of about 3 to about 18 and preferably more than about 6. The catalyst has an equilibrium MAT conversion activity level of at least about 40 volume percent and more preferably at least about 60 volume percent, and bears an accumulation of heavy metal(s) corresponding to at least about 3,000 ppm, more preferably at least about 4,000 ppm, and still more preferably at least about 5,000 ppm by weight of Nickel Equivalents, expressed as metal(s) on regenerated equilibrium catalyst.

In accordance with the invention, the carbo-metallic feed is also brought into contact with one or more additional materials including particularly water in a weight ratio relative to feed ranging from about 0.04 to about 0.15, more preferably about 0.04 to about 0.1 and still more preferably about 0.05 to about 0.1. Such additional materials, including the water, may be brought into admixture with the feed prior to, during or after mixing the feed with the aforementioned catalyst, and either after or, preferably, before, vaporization of the feed.

The water may be added as a vapor (steam) or as a liquid. By adding the water in the liquid phase rather than as steam, it is believed that the water helps to break up or cause misting of the hydrocarbon in the presence of the regenerated catalyst particles, which in turn provides for greater surface contact of the catalyst with the feed. It is also believed that the addition of water functions to effect reduced coking and to reduce detrimental effects of excessive metal deposition by at least some of the following mechanisms. The presence of the water may reduce the initial deposition of metals onto the catalyst surface and thereby lessen the effect of the increased quantities of metal present in feeds containing reduced crude oil. The water also may increase the acidity of the catalyst particles by carbonium ion formation which in turn could enhance the activity of the catalyst in the cracking process. The water is also believed to aid in desorption of nitrogen compounds from the surface of the catalyst particles and/or to inhibit their adsorption. The presence of water in the reaction chamber also competes with the of high molecular weight molecules on the surface of the zeolite catalyst particles and may thus interrupt coke formation. Likewise, the presence of water lowers the partial pressure of the hydrocarbons and also may result in steam distillation to remove hydrocarbons from catalyst surfaces.

The use of recycled water from the same or a similar hydrocarbon conversion process provides additional advantages as compared to the use of water from other sources. First of all, the use of recycled water is attractive from an economical and ecological viewpoint since the recycled water contains $H_2S$ produced in the cracking operation. By using recycled water, the $H_2S$ in this water is not vented to the atmosphere as an undesirable emission, and this liquid effluent does not require further treatment to remove $H_2S$ from process gases prior to venting these gases to the atmosphere, which may eliminate or reduce the amount of $H_2S$ processing equipment and expense. Moreover, the presence of $H_2S$ in the recycled water may serve to further reduce coking. It is believed that the $H_2S$ reacts with free metal on the catalyst surface to convert this free metal to a sulfide which is a much less reactive material as compared to the free metal per se. Accordingly, the coking and hydrogen production are diminished due to the addition of the $H_2S$. The reaction of the catalyst surface with free metals and/or metallic oxides such as $Na_2O$ may also be reduced.

By employing the $H_2S$ produced in the conversion reaction, the need for the addition of sulfur containing compounds from an external source is eliminated saving the added costs. Accordingly, by using recycled water, the troublesome problems of disposing of the $H_2S$ present is reduced and advantageous use is made of the $H_2S$ in the process.

A stream is formed comprising a suspension of said catalyst in said converter feed and additional gaseous and/or vaporized material including steam wherein the ratio of the partial pressure of the added gaseous and/or vaporized material relative to the partial pressure of the feed is in the range of about 0.25 to about 4. Preferably the converter feed is at a temperature of about 500° F. or less when brought together with the cracking catalyst. Preferably, also, the additional gaseous and/or vaporized material includes $H_2O$ in a weight ratio relative to feed of at least about 0.04 introduced as liquid water and/or steam.

The feed, catalyst and additional materials may be introduced into the progressive flow type reactor at one or more points. Such reactor includes an elongated reaction chamber, preferably a riser, which is at least partly vertical or inclined and in which the feed material, resultant products and catalyst are maintained in contact with one another while flowing as a dilute phase or stream for a predetermined vapor residence time in the range of about 0.5 to about 6, preferably about 0.5 to about 3, and more preferably less than about 2 or 2.5 seconds. Preferably, the stream is caused to flow through the elongated reaction chamber at a lineal velocity of at least about 25 and more preferably at least about 35 feet per second. While in the reactor, the feed undergoes a conversion step which includes cracking.

The reaction is conducted at a temperature of about 900° F., preferably about 975° F. to about 1300° F. and more preferably about 985° F. to about 1200° F., as measured at the reaction chamber exit, under a total pressure of about 10 to about 50 and preferably about 15 to about 35 psia (pounds per square inch absolute) and under other conditions sufficiently severe to provide a conversion per pass preferably in the range of about 60 to about 90, and more preferably about 70 to about 85, volume percent and to lay down coke on the catalyst in an amount in the range of about 0.3 to about 3% by weight and preferably at least about 0.5%. The overall rate of coke production, based on weight of fresh feed, is at least about 6% by weight, preferably in the range of about 6% to 14% by weight. The process can be operated with the foregoing conditions being insufficient to fully vaporize the converter feed. According to a preferred embodiment, the conversion per pass comprises a yield of $C_5$-430° F. gasoline that represents at least about 44% by volume of the total amount of fresh feed.

At the end of the residence time at at least one location along the elongated reaction chamber, including an outlet means at the downstream end of the elongated reaction chamber or an extension thereof, the metals-bearing, coked catalyst is abruptly separated from at least a substantial portion of the stream comprising said catalyst, stream and resultant cracking products formed in the elongated reaction chamber. Abrupt separation is accomplished by projecting catalyst particles in a direction established by the elongated reaction chamber or said extension, diverting vapors in the stream, including said stream and said products, by an abrupt change of direction relative to the direction in which the catalyst particles are projected and interposing wall means between the thus projected catalyst and the diverted steam and products.

According to a preferred embodiment, the catalyst which is thus separated is discharged into a catalyst collection chamber. Preferably at least about 50%, more preferably at least about 80% and still more preferably at least about 90% or 95% by volume and most preferably substantially all of the volume of the total feed and product vapors which have passed through the elongated reaction chamber are prevented from having further contact with the thus separated catalyst in the catalyst collection chamber.

After stripping the catalyst to remove entrained and/or adsorbed hydrocarbons, the metals bearing, coked catalyst is regenerated by burning the coke in at least one regeneration zone with oxygen-containing combustion-supporting gas, while forming combustion product gases comprising CO and/or $CO_2$. The $CO:CO_2$ molar ratio of the combustion product gases formed from the burning of at least the major weight portion of the coke is maintained at a level of at least about 0.25, more preferably at least about 0.33 and still more preferably at least about 1 or 1.5, while such gases are in heat exchange contact with the catalyst. Preferably this ratio is at least about 0.3 and still more preferably at least about 1 or 1.5. The coke is burned under conditions of time, temperature and atmosphere sufficient to reduce the weight of carbon on the catalyst to about 0.25% or less, preferably about 0.1% or less and still more preferably about 0.05% or less.

According to a particularly preferred embodiment, the amount of combustion-supporting gas supplied to the regeneration operation as a whole is limited to less than the stoichiometric amount which would be required to burn all of the carbon in the coke to $CO_2$, to burn all of the hydrogen in the coke to $H_2O$ and to burn any other combustibles which may be present in the coke to their respective combustion products. It is also preferred that the total free oxygen mole percent of all gases resulting from the entire, completed combustion of coke in the regeneration zone or zones be restricted to an amount substantially less than 2%, preferably about 0.2% or less. The regenerated catalyst at a temperature of at least about 1275° F. and preferably in the range of about 1300° F. to about 1400° F., is recycled to the reactor for contact with fresh feed.

Depending on how the process of the invention is practiced, one or more of the following advantages may be realized. If desired, and preferably, the process may be operated without added hydrogen in the reaction chamber. If desired, and preferably, the process may be operated without prior hydrotreating of the feed and/or without other process of removal of asphaltenes or metals from the feed, and this is true even where the carbo-metallic oil as a whole contains more than about 5.5 ppm Nickel Equivalents by weight of heavy metals and has a carbon residue on pyrolysis greater than about 1%, greater than about 1.4% or greater than about 2% by weight. Moreover, all of the converter feed, as above described, may be cracked in one and the same conversion chamber. The cracking reaction may be carried out with a catalyst which has previously been used (recycled, except for such replacement as required to compensate for normal losses and deactivation) to crack a carbo-metallic feed under the above described conditions. Heavy hydrocarbons not cracked to gasoline in a first pass may be recycled with or without hydrotreating for further cracking in contact with the same kind of feed in which they were first subjected to cracking conditions, and under the same kind of conditions; but operation in a substantially once-through or single pass mode (e.g. less than about 15% by volume of recycle based on volume of fresh feed) is preferred.

The process as above described may be practiced in conjunction with a number of preferred alternatives, refinements or more commonly encountered conditions, a few of which will be referred to under the heading "Description of Various and Preferred Embodiments" below.

DESCRIPTION OF VARIOUS AND PREFERRED EMBODIMENTS

Carbo-Metallic Oil Converter Feed

Figure 1:
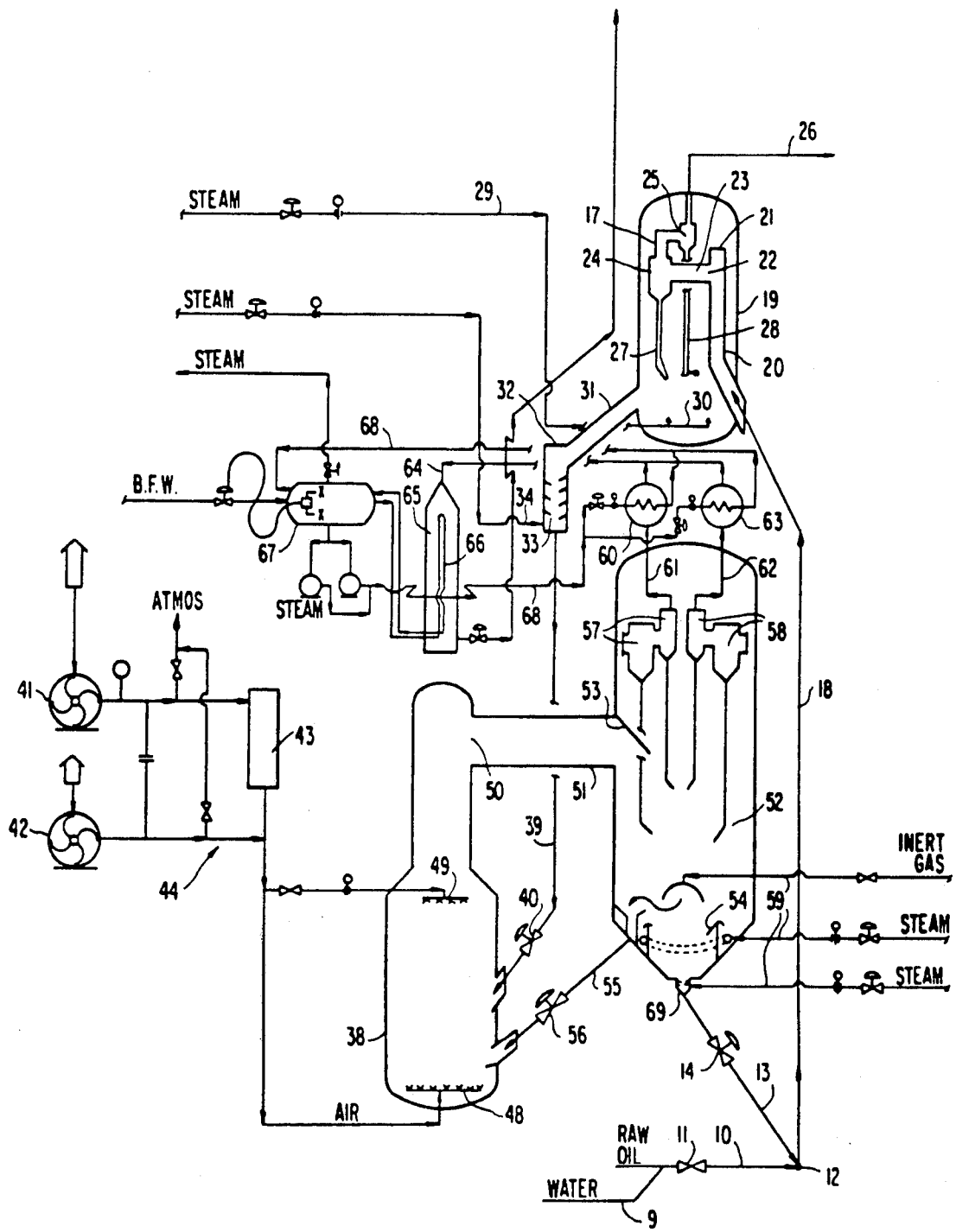
FIG. 1 is a schematic diagram of a first apparatus for carrying out the invention.

The present invention provides a process for the continuous catalytic conversion of a wide variety of carbo-metallic oils to lower molecular weight products, while maximizing production of highly valuable liquid products, and making it possible, if desired, to avoid vacuum distillation and other expensive treatments such as hydrotreating. The term "oils", includes not only those predominantly hydrocarbon compositions which are liquid at room temperature (i.e., 68° F.), but also those predominantly hydrocarbon compositions which are asphalts or tars at ambient temperature but liquify when heated to temperatures in the range of up to about 800° F. The invention is applicable to carbo-metallic oils, whether of petroleum origin or not. For example, provided they have the requisite boiling range, carbon residue on pyrolysis and heavy metals content, the invention may be applied to the processing of such widely diverse materials as heavy bottoms from crude oil, heavy bitumen crude oil, those crude oils known as "heavy crude" which approximate the properties of reduced crude shale oil, tar sand extract, products from coal liquification and solvated coal, atmospheric and vacuum reduced crude, extracts and/or bottoms (raffinate) from solvent de-asphalting, aromatic extract from lube oil refining, tar bottoms, heavy cycle oil, slop oil, other refinery waste streams and mixtures of the foregoing. Such mixtures can for instance be prepared by mixing available hydrocarbon fractions, including oils, tars, pitches and the like. Also, powdered coal may be suspended in the carbo-metallic oil. Persons skilled in the art are aware of techniques for demetalation of carbo-metallic oils, and demetalated oils may be converted using the invention; but it is an advantage of the invention that it can employ as feedstock carbo-metallic oils that have had no prior demetalation treatment. Likewise, the invention can be applied to hydrotreated feedstocks; but it is an advantage of the invention that it can successfully convert carbo-metallic oils which have had substantially no prior hydrotreatment. However, the preferred application of the process is to reduced crude, i.e., that fraction of crude oil boiling at and above 650° F., alone or in admixture with virgin gas oils. While the use of material that has been subjected to prior vacuum distillation is not excluded, it is an advantage of the invention that it can satisfactorily process material which has had no prior vacuum distillation, thus saving on capital investment and operating costs as compared to conventional FCC processes that require a vacuum distillation unit.

Table I below provides a comparison between a typical vacuum gas oil (VGO) which has been used heretofore in fluid catalytic cracking, with various reduced crudes, constituting a few examples of the many reduced crudes useable in the present invention:

the terms "boils above" and "650° F.+" are not intended to imply that all of the material characterized by said terms will have the capability of boiling. The carbo-metallic oils contemplated by the invention may contain material which may not boil under any conditions; for example, certain asphalts and asphaltenes may crack thermally during distillation, apparently without boiling. Thus, for example, when it is said that the feed comprises at least about 70% by volume of material which boils above about 650° F., it should be understood that the 70% in question may include some material which will not boil or volatilize at any temperature. These non-boilable materials, when present, may frequently or for the most part be concentrated in portions of the feed which do not boil below about 1000° F., 1025° F. or higher. Thus, when it is said that at least about 10%, more preferably about 15% and still more preferably at least about 20% (by volume) of the 650° F.+ fraction will not boil below about 1000° F. or 1025° F., it should be understood that all or any part of the material not boiling below about 1000° or 1025° F., may or may not be volatile at and above the indicated temperatures.

Preferably, the contemplated feeds, or at least the

TABLE 1

| Oil or Crude | API Grav. 650+[2] Total | Volume % of 650+ Fraction Boiling at | | Ramsbottom Carbon Content | | Wt. ppm Metals[3] | | | Ni Equiv. | Wt. % S in 650+ Total | Weight of Nitrogen (ppm) 650+ Fraction | | Wt. ppm Na |
|---|---|---|---|---|---|---|---|---|---|---|---|---|---|
| | | 650–1025 | 1025+ | 650–1025 | 650+ Total | Ni | V | Fe | | | Total | Basic | |
| VGO | 28.4 | 100 | 0.0 | 0.38 | 0.38 | 0.2 | 0.1 | 2.6 | .059 | .83 | 722 | 260 | 0.8 |
| Mexican Isthmus | 16.9 (21.3) | 65.3 | 34.7 | 0.49 | 4.96 | 2.5+ | 33.8 | 1.9 | 9.81 | 2.75 | 950 | 450 | 6.9 |
| Mexican Kurkuk[1] | 17.4 | | | | 9.30 | 35.0 | 99.0 | 17.0 | 58.02 | 2.94 | 2100 | 723 | 1.8 |
| Murban | 23.1 | 78.7 | 21.3 | 0.49 | 3.99 | 3.0+ | 1.5 | 11.9 | 4.99 | 1.64 | 512 | 200 | 7.5 |
| Arabian Light | 19.1 | 64.7 | 35.3 | 0.47 | 6.56 | 6.4 | 24.7 | 3.2 | 12.00 | 2.39 | 940 | 507 | 9.2 |
| Arabian Med. | 14.5 | 51.8 | 48.2 | 0.46 | 9.00 | 19.6 | 63.0 | 2.9 | 33.13 | 4.43 | | | |
| Ekofisk | 22.7 | 72.8 | 27.2 | 0.36 | 4.42 | 1.4 | 3.0 | 2.4 | 2.36 | 0.38 | | | |
| Fosterton | 10.9 | 43.6 | 56.4 | 0.42 | 16.81 | 48.8 | 119.0 | 3.1 | 74.03 | 4.22 | | | |
| Iranian Light | 17.4 | 60.8 | 39.2 | 0.48 | 9.01 | 21.9 | 60.0 | 3.1 | 34.84 | 2.50[4] | | | |
| La./Miss Sweet | 23.7 | 80.2 | 19.8 | 0.33 | 4.36 | 2.7+ | — | 8.5 | 3.90 | 0.26 | | | |
| Wyoming Sour | 12.4 | 40.7 | 59.3 | 0.32 | 15.1 | 0.6 | 70.0 | 2.0 | 15.47 | 3.84 | | | |

[1]A refinery blend of Mexican and Kirkuk crudes.
[2]Throughout the table 650 and 1025 refer to 650° F. and 1025° F. respectively; 650+ refers to 650° F.+ material as defined below.
[3]Copper level was below 0.5%, except that Mexican Kirkuk contained 0.6%; all metals expressed as metal in ppm, based on the weight of the 650+ fraction.
[4]Calculated.

As can be seen from the Table, the heavier or higher boiling feeds are characterized by relatively lower API Gravity values than the illustrative vacuum gas oil (VGO). In general lower boiling and/or higher API Gravity cat cracker feedstocks have been considered highly superior to higher boiling and/or lower API Gravity feedstocks. Comparisons of the gasoline yield of high boiling feeds compared to medium boiling feeds at constant coke yield have shown that the medium boiling feeds provide superior gasoline yield for a given coke yield.

In accordance with the invention one provides a carbo-metallic oil feedstock, at least about 70%, more preferably at least about 85% and still more preferably about 100% (by volume) of which boils at and above about 650° F. All boiling temperatures herein are based on standard atmospheric pressure conditions. In carbo-metallic oil partly or wholly composed of material which boils at and above about 650° F., such material is referred to herein as 650° F.+ material; and 650° F.+ material which is part of or has been separated from an oil containing components boiling above and below 650° F. may be referred to as a 650° F.+ fraction. But 650° F.+ material therein, have a carbon residue on pyrolysis of at least about 2 or greater. For example, the Ramsbottom carbon content may be in the range of about 2 to about 12 and most frequently at least about 4. A particularly common range is about 4 to about 8. Note that the illustrative VGO in Table 1 has a Ramsbottom carbon residue value of 0.38, and that the 650° to 1025° F. fractions of the various reduced crudes have Ramsbottom carbon values between about 0.3 and about 0.5, whereas the various reduced crudes as a whole (650+ Total) vary upwards in Ramsbottom carbon value from about 4 to about 16.8, and still higher values are contemplated.

Preferably, the feed has an average composition characterized by an atomic hydrogen to carbon ratio in the range of about 1.2 to about 1.9, and preferably about 1.3 to about 1.8.

The carbo-metallic feeds employed in accordance with the invention, or at least the 650° F.+ material therein, may contain at least about 5.5 parts per million of Nickel Equivalents, as defined above, of which at least about 2 parts per million is nickel (as metal, by weight). Carbo-metallic oils within the above range can be prepared from mixtures of two or more oils, some of which do and do not contain the quantities of Nickel Equivalents and nickel set forth above. It should also be noted that the above values for Nickel Equivalents and nickel represent time-weighted averages for a substantial period of operation of the conversion unit, such as one month, for example. It should also be noted that the heavy metals have in certain circumstances exhibited some lessening of poisoning tendency after repeated oxidations and reductions on the catalyst, and the literature describes criteria for establishing "effective metal" values. For example, see the article by Cimbalo, et al, entitled "Deposited Metals Poison FCC Catalyst", *Oil and Gas Journal*, May 15, 1972, pp. 112–122, the contents of which are incorporated herein by reference. If considered necessary or desirable, the contents of Nickel Equivalents and nickel in the carbo-metallic oils processed according to the invention may be expressed in terms of "effective metal" values. Notwithstanding the gradual reduction in poisoning activity noted by Cimbalo, et al, the regeneration of catayst under normal FCC regeneration conditions may not, and usually does not, severely impair the dehydrogenation, demethanation and aromatic condensation activity of heavy metals accumulated on cracking catalyst.

It is known that about 0.1 to about 5 weight per cent of "sulfur" in the form of elemental sulfur and/or its compounds (but reported as elemental sulfur based on the weight of feed) appears in FCC feeds and that the sulfur and modified forms of sulfur can find their way into the resultant gasoline product and, where lead is added, tends to reduce its susceptibility to octane enhancement. Sulfur in the product gasoline often requires sweetening when processing high sulfur containing crudes. To the extent that sulfur is present in the coke, it also represents a potential air pollutant since the regenerator burns it to $SO_2$ and $SO_3$. However, we have found that in our process the sulfur in the feed is on the other hand able to inhibit heavy metal activity by maintaining metals such as Ni, V, Cu and Fe in the sulfide form in the reactor. These sulfides are much less active than the metals themselves in promoting dehydrogenation and coking reactions. Accordingly, it is acceptable to carry out the invention with a carbo-metallic oil having at least about 0.3%, acceptably more than about 0.8% and more acceptably at least about 1.5% by weight of sulfur in the 650° F.+ fraction.

The carbo-metallic oils useful in the invention may and usually do contain significant quantities of compounds containing nitrogen, a substantial portion of which may be basic nitrogen. For example, the total nitrogen content of the carbo-metallic oils may be at least about 0.05% by weight. Since cracking catalysts owe their cracking activity to acid sites on the catalyst surface or in its pores, basic nitrogen-containing compounds may temporarily neutralize these sites, poisoning the catalyst. However, the catalyst is not permanently damaged since the nitrogen can be burned off the catalyst during regeneration, as a result of which the acidity of the active sites is restored.

The carbo-metallic oils may also include significant quantities of pentane insolubles, for example at least about 0.5% by weight, and more typically about 2% or more or even about 4% or more. These may include for instance asphaltenes and other materials.

Alkali and alkaline earth metals generally do not tend to vaporize in large quantities under the distillation conditions employed in distilling crude oil to prepare the vacuum gas oils normally used as FCC feedstocks. Rather, these metals remain for the most part in the "bottoms" fraction (the non-vaporized high boiling portion) which may for instance be used in the production of asphalt or other by-products. However, reduced crude and other carbo-metallic oils are in many cases bottoms products, and therefore may contain significant quantities of alkali and alkaline earth metals such as sodium. These metals deposit upon the catalyst during cracking. Depending on the composition of the catalyst and magnitude of the regeneration temperatures to which it is exposed, these metals may undergo interactions and reactions with the catalyst (including the catalyst support) which are not normally experienced in processing VGO under conventional FCC processing conditions. If the catalyst characteristics and regeneration conditions so require, one will of course take the necessary precautions to limit the amounts of alkali and alkaline earth metal in the feed, which metals may enter the feed not only as brine associated with the crude oil in its natural state, but also as components of water or steam which are supplied to the cracking unit. Thus, careful desalting of the crude used to prepare the carbo-metallic feed may be important when the catalyst is particularly susceptible to alkali and alkaline earth metals. In such circumstances, the content of such metals (hereinafter collectively referred to as "sodium") in the feed can be maintained at about 1 ppm or less, based on the weight of the feedstock. Alternatively, the sodium level of the feed may be keyed to that of the catalyst, so as to maintain the sodium level of the catalyst which is in use substantially the same as or less than that of the replacement catalyst which is charged to the unit.

According to a particularly preferred embodiment of the invention, the carbo-metallic oil feedstock constitutes at least about 70% by volume of material which boils above about 650° F., and at least about 10% of the material which boils above about 650° F. will not boil below about 1025° F. The average composition of this 650° F.+ material may be further characterized by: (a) an atomic hydrogen to carbon ratio in the range of about 1.3 to about 1.8: (b) a Ramsbottom carbon value of at least about 2; (c) at least about four parts per million of Nickel Equivalents, as defined above, of which at least about two parts per million is nickel (as metal, by weight); and (d) at least one of the following: (i) at least about 0.3% by weight of sulfur, (ii) at least about 0.05% by weight of nitrogen, and (iii) at least about 0.5% by weight of pentane insolubles. Very commonly, the preferred feed will include all of (i), (ii), and (iii), and other components found in oils of petroleum and non-petroleum origin may also be present in varying quantities providing they do not prevent operation of the process.

Although there is no intention of excluding the possibility of using a feedstock which has previously been subjected to some cracking, the present invention has the definite advantage that it can successfully produce large conversions and very substantial yields of liquid hydrocarbon fuels from carbo-metallic oils which have not been subjected to any substantial amount of cracking. Thus, for example, and preferably, at least about 85%, more preferably at least about 90% and most preferably substantially all of the carbo-metallic feed introduced into the present process is oil which has not previously been contacted with cracking catalyst under cracking conditions. Moreover, the process of the invention is suitable for operation in a substantially once-through or single pass mode. Thus, the volume of recycle, if any, based on the volume of fresh feed is preferably about 15% or less and more preferably about 10% or less.

Catalyst

In general, the weight ratio of catalyst to fresh feed (feed which has not previously been exposed to cracking catalyst under cracking conditions) used in the process is in the range of about 3 to about 18. Preferred and more preferred ratios are about 4 to about 12, more preferably about 5 to about 10 and still more preferably about 6 to about 10, a ratio of about 6 to about 8 presently being considered most nearly optimum. Within the limitations of product quality requirements, controlling the catalyst to oil ratio at relatively low levels within the aforesaid ranges tends to reduce the coke yield of the process, based on fresh feed.

In conventional FCC processing of VGO, the ratio between the number of barrels per day of plant through-put and the total number of tons of catalyst undergoing circulation throughout all phases of the process can vary widely. For purposes of this disclosure, daily plant through-put is defined as the number of barrels of fresh feed boiling above about 650° F. which that plant processes per average day of operation to liquid products boiling below about 430° F. For example, in one commercially successful type of FCC-VGO operation, about 8 to about 12 tons of catalyst are under circulation in the process per 1000 barrels per day of plant through-put. In another commercially successful process, this ratio is in the range of about 2 to 3. While the present invention may be practiced in the range of about 2 to about 30 and more typically about 2 to about 12 tons of catalyst inventory per 1000 barrels of daily plant through-put, it is preferred to carry out the process of the present invention with a very small ratio of catalyst weight to daily plant throughput. More specifically, it is preferred to carry out the process of the present invention with an inventory of catalyst that is sufficient to contact the feed for the desired residence time in the above indicated catalyst to oil ratio while minimizing the amount of catalyst inventory, relative to plant through-put, which is undergoing circulation or being held for treatment in other phases of the process such as, for example, stripping, regeneration and the like. Thus, more particularly, it is preferred to carry out the process of the present invention with about 2 to about 5 and more preferably about 2 tons of catalyst inventory or less per thousand barrels of daily plant through-put.

In the practice of the invention, catalyst may be added continuously or periodically, such as, for example, to make up for normal losses of catalyst from the system. Moreover, catalyst addition may be conducted in conjunction with withdrawal of catalyst, such as, for example, to maintain or increase the average activity level of the catalyst in the unit. For example, the rate at which virgin catalyst is added to the unit may be in the range of about 0.1 to about 3, more preferably about 0.15 to about 2, and most preferably to about 0.2 to about 1.5 pounds per barrel of feed. If on the other hand equilibrium catalyst from FCC operation is to be utilized, replacement rates as high as about 5 pounds per barrel can be practiced. Where circumstances are such that the catalyst employed in the unit is below average in resistance to deactivation and/or conditions prevailing in the unit tend to promote more rapid deactivation, one may employ rates of addition greater than those stated above; but in the opposite circumstances, lower rates of addition may be employed.

Without wishing to be bound by any theory, it appears that a number of features of the process to be described in greater detail below, such as, for instance, the residence time and the admixture of water with the feedstock, tend to restrict the extent to which cracking conditions produce metals in the reduced state on the catalyst from heavy metal sulfide(s), sulfate(s) or oxide(s) deposited on the catalyst particles by prior exposures to carbo-metallic feedstock and regeneration conditions. Thus, the process appears to afford significant control over the poisoning effect of heavy metals on the catalyst, even when the accumulations of such metals are quite substantial.

Accordingly, the process may be practiced with catalyst bearing accumulations of heavy metals which heretofore would have been considered quite intolerable in conventional FCC-VGO operations. For these reasons, operation of the process with catalyst bearing heavy metals accumulations in the range of about 3,000 to about 70,000 ppm Nickel Equivalents, on the average is contemplated. More specifically, the accumulation may be in the range of about 4,000 to about 50,000 ppm and particularly more than about 5,000 to about 30,000 ppm. The foregoing ranges are based on parts per million of Nickel Equivalents, in which the metals are expressed as metal, by weight, measured on and based on regenerated equilibrium catalyst. For example, one might employ equilibrium catalyst from another unit, for example, an FCC unit which has been used in the cracking of a feed, e.g. vacuum gas oil, having a carbon residue on pyrolysis of less than 1 and containing less than about 4 ppm Nickel Equivalents of heavy metals.

In any event, the equilibrium concentration of heavy metals in the circulating inventory of catalyst can be controlled (including maintained or varied as desired or needed) by manipulation of the rate of catalyst addition discussed above. Thus, for example, addition of catalyst may be maintained at a rate which will control the heavy metals accumulation on the catalyst in one of the ranges set forth above.

In general, it is preferred to employ a catalyst having a relatively high level of cracking activity, providing high levels of conversion and productivity at low residence times. The conversion capabilities of the catalyst may be expressed in terms of the conversion produced during actual operation of the process and/or in terms of conversion produced in standard catalyst activity tests. For example, it is preferred to employ catalyst which, in the course of extended operation in the process, is sufficiently active for sustaining a level of conversion of at least about the tentative ASTM MAT test developed by ASTM Committee D-32 60%. In this connection, conversion is expressed in liquid volume percent, based on fresh feed. Also, for example, the preferred catalyst may be defined as one which, in its virgin or equilibrium state, exhibits a specified activity expressed as a volume percentage derived by the MAT (micro-activity test). For purposes of the present invention the foregoing percentage is the volume percentage of standard feedstock that is converted to 430° F. end point gasoline and lighter products at 900° F., 16 whsv (weight hourly space velocity), calculated on the basis of catalyst dried at 1100° F.) and 3C/O (catalyst to oil ratio) by using an appropriate standard feedstock, e.g.

Davison WHPS-12 primary gas oil, having the following analysis and properties:

| | |
|---|---|
| API Gravity at 60° F., degrees | 31.0 |
| Specific Gravity at 60° F., g/cc | 0.8708 |
| Ramsbottom Carbon, wt. % | 0.09 |
| Conradson Carbon, wt. % (est.) | 0.04 |
| Carbon, wt. % | 84.92 |
| Hydrogen, wt. % | 12.94 |
| Sulfur, wt. % | 0.68 |
| Nitrogen, ppm | 305 |
| Viscosity at 100° F., centistokes | 10.36 |
| Watson K Factor | 11.93 |
| Aniline Point | 182 |
| Bromine No. | 2.2 |
| Paraffins, Vol. % | 31.7 |
| Olefins, Vol. % | 1.8 |
| Naphthenes, Vol. % | 44.0 |
| Aromatics, Vol. % | 22.7 |
| Average Molecular Weight | 284 |
| Nickel | Trace |
| Vanadium | Trace |
| Iron | Trace |
| Sodium | Trace |
| Chlorides | Trace |
| B S & W | Trace |
| Distillation, °F. | ASTM D-1160 |
| IBP | 445 |
| 10% | 601 |
| 30% | 664 |
| 50% | 701 |
| 70% | 734 |
| 90% | 787 |
| FBP | 834 |

The end point of the gasoline produced in the MAT test is often defined as 430° F. tbp (true boiling point) which is a standard laboratory distillation, but other end points could serve equally well for our present purposes. Conversion is calculated by subtracting from 100 the volume percent (based on fresh feed) of those products heavier than gasoline which remain in the recovered product.

The catalyst may be introduced into the process in its virgin form or, as previously indicated, in other than virgin form; e.g. one may use equilibrium catalyst withdrawn from another unit, such as catalyst that has been employed in the cracking of a different feed. When characterized on the basis of MAT activity, the preferred catalysts may be described on the basis of their MAT activity "as introduced" into the process of the present invention, or on the basis of their "as withdrawn" or equilibrium MAT activity in the process of the present invention, or on both of these bases. A preferred MAT activity for virgin and non-virgin catalyst "as introduced" into the process of the present invention is at least about 60%, but it will be appreciated that, particularly in the case of non-virgin catalysts supplied at high addition rates, lower MAT activity levels may be acceptable. An acceptable "as withdrawn" or equilibrium MAT activity level of catalyst which has been used in the process of the present invention is about 40% or more and about 60% is a preferred value.

One may employ any hydrocarbon cracking catalyst having the above indicated conversion capabilities. A particularly preferred class of catalysts includes those which have pore structures into which molecules of feed material may enter for adsorption and/or for contact with active catalytic sites within or adjacent the pores. Various types of catalysts are available within this classification, including for example the layered silicates, e.g. smectites. Although the most widely available catalysts within this classification are the well-known zeolite-containing catalysts, non-zeolite catalysts are also contemplated.

The preferred zeolite-containing catalysts may include any zeolite, whether natural, semi-synthetic or synthetic, alone or in admixture with other materials which do not significantly impair the suitability of the catalyst, provided the resultant catalyst has the activity and pore structure referred to above. For example, if the catalyst is a mixture, it may include the zeolite component associated with or dispersed in a porous refractory inorganic oxide carrier; in such case the catalyst may for example contain about 1% to about 60%, more preferably about 1 to about 40% and most typically about 5 to about 25% by weight, based on the total weight of catalyst (water free basis) of the zeolite, the balance of the catalyst being the porous refractory inorganic oxide alone or in combination with any of the known adjuvants for promoting or suppressing various desired and undesired reactions. For a general explanation of the genus of zeolite, molecular sieve catalysts useful in the invention, attention is drawn to the disclosures of the articles entitled "Refinery Catalysts Are a Fluid Business" and "Making Cat Crackers Work on Varied Diet", appearing respectively in the July 26, 1978 and Sept. 13, 1978 issues of Chemical Week magazine. The descriptions of the aforementioned publications are incorporated herein by reference.

For the most part, the zeolite components of the zeolite-containing catalysts will be those which are known to be useful in FCC cracking processes. In general, these are crystalline aluminosilicates, typically made up of tetra coordinated aluminum atoms associated through oxygen atoms with adjacent silicon atoms in the crystal structure. However, the term "zeolite" as used in this disclosure contemplates not only aluminosilicates, but also substances in which the aluminum has been party or wholly replaced, such as for instance by gallium and/or other metal atoms, and further includes substances in which all or part of the silicon has been replaced, such as for instance by germanium. Titanium and zirconium substitution may also be practiced.

Most zeolites are prepared or occur naturally in the sodium form, so that sodium cations are associated with the electro negative sites in the crystal structure. The sodium cations tend to make zeolites inactive and much less stable when exposed to hydrocarbon conversion conditions, particularly high temperatures. Accordingly, the zeolite may be ion exchanged, and where the zeolite is a component of a catalyst composition, such ion exchanging may occur before or after incorporation of the zeolite as a component of the composition. Suitable cations for replacement of sodium in the zeolite crystal structure include ammonium (decomposable to hydrogen), hydrogen, rare earth metals, alkaline earth metals, etc. Various suitable ion exchange procedures and cations which may be exchanged into the zeolite crystal structure are well known to those skilled in the art.

Examples of the naturally occuring crystalline aluminosilicate zeolites which may be used as or included in the catalyst for the present invention are faujasite, mordenite, clinoptilote, chabazite, analcite, erionite, as well as levynite, dachiardite, paulingite, noselite, ferriorite, heulandite, scolccite, stibite, harmotome, phillipsite, brewsterite, flarite, datolite, gmelinite, caumnite, leucite, lazurite, scaplite, mesolite, phtholite, nepheline, matrolite, offretite and sodalite.

Examples of the synthetic crystalline aluminosilicate zeolites which are useful as or in the catalyst for carrying out the present invention are Zeolite X, U.S. Pat. No. 2,882,244, Zeolite Y, U.S. Pat. No. 3,130,007; and Zeolite A, U.S. Pat. No. 2,882,243; as well as Zeolite B, U.S. Pat. No. 3,008,803; Zeolite D, Canada Pat. No. 661,981; Zeolite E, Canada Pat. No. 614,495; Zeolite F, U.S. Pat. No. 2,996,358; Zeolite H, U.S. Pat. No. 3,010,789; Zeolite J. U.S. Pat. No. 3,011,869; Zeolite L, Belgian Pat. No. 575,177; Zeolite M. U.S. Pat. No. 2,995,423, Zeolite O, U.S. Pat. No. 3,140,252; Zeolite Q, U.S. Pat. No. 2,991,151; Zeolite S, U.S. Pat. No. 3,054,657, Zeolite T, U.S. Pat. No. 2,950,952; Zeolite W, U.S. Pat. No. 3,012,853; Zeolite Z, Canada Pat. No. 614,495; and Zeolite Omega, Canada Pat. No. 817,915. Also, ZK-4HJ,alpha beta and ZSM-type zeolites are useful. Moreover, the zeolites described in U.S. Pat. Nos. 3,140,249, 3,140,253, 3,944,482 and 4,137,151 are also useful, the disclosures of said patents being incorporated herein by reference.

The crystalline aluminosilicate zeolites have a faujasite-type crystal structure are particularly preferred for use in the present invention. This includes particularly natural faujasite and Zeolite X and Zeolite Y.

The crystalline aluminosilicate zeolites, such as synthetic faujasite, will under normal conditions crystallize as regularly shaped, discrete particles of about one to about ten microns in size, and, accordingly, this is the size range frequently found in commercial catalysts which can be used in the invention. Preferably, the particle size of the zeolites is from about 0.5 to about 10 microns and more preferably is from about 0.1 to about 2 microns or less. For example, zeolites prepared in situ from calcined kaolin may be characterized by even smaller crystallites. Crystalline zeolites exhibit both an interior and an exterior surface area, which we have defined as "portal" surface area, with the largest portion of the total surface area being internal. By portal surface area, we refer to the outer surface of the zeolite crystal through which reactants are considered to pass in order to convert to lower boiling products. Blockage of the internal channels by, for example, coke formation, blockage of entrance to the internal channels by deposition of coke in the portal surface area, and contamination by metals poisoning, will greatly reduce the total zeolite surface area. Therefore, to minimize the effect of contamination and pore blockage, crystals larger than the normal size cited above are preferably not used in the catalysts of this invention.

Commercial zeolite-containing catalysts are available with carriers containing a variety of metal oxides and combination thereof, including for example silica, alumina, magnesia, and mixtures thereof and mixtures of such oxides with clays as e.g. described in U.S. Pat. No. 3,034,948. One may for example select any of the zeolite-containing molecular sieve fluid cracking catalysts which are suitable for production of gasoline from vacuum gas oils. However, certain advantages may be attained by judicious selection of catalysts having marked resistance to metals. A metal resistant zeolite catalyst is, for instance, described in U.S. Pat. No. 3,944,482, in which the catalyst contains 1-40 weight percent of a rare earth-exchanged zeolite, the balance being a refractory metal oxide having specified pore volume and size distribution. Other catalysts described as "metals-tolerant" are described in the above mentioned Cimbalo et al article.

In general, it is preferred to employ catalysts having an over-all particle size in the range of about 5 to about 160, more preferably about 40 to about 120, and most preferably about 40 to about 80 microns.

The catalyst composition may also include one or more combustion promoters which are useful in the subsequent step of regenerating the catalyst. Cracking of carbo-metallic oils results in substantial deposition of coke on the catalyst, which coke reduces the activity of the catalyst. Thus, in order to restore the activity of the catalyst the coke is burned off in a regeneration step, in which the coke is converted to combustion gases including carbon monoxide and/or carbon dioxide. Various substances are known which, when incorporated in cracking catalyst in small quantities, tend to promote conversion of the coke to carbon monoxide and/or carbon dioxide. Promoters of combustion to carbon monoxide tend to lower the temperature at which a given degree of coke removal can be attained, thus diminishing the potential for thermal deactivation of the catalyst. Such promoters, normally used in effective amounts ranging from a trace up to about 10 or 20% by weight of the catalyst, may be of any type which generally promotes combustion of carbon under regenerating conditions, or may be somewhat selective in respect to completing the combustion of CO, or, more preferably, for reasons explained in greater detail below, may have some tendency to combust carbon to carbon monoxide in preference to carbon dioxide.

Although a wide variety of other catalysts, including both zeolite-containing and non-zeolite-containing may be employed in the practice of the invention the following are examples of commercially available catalysts which have been employed in practicing the invention:

TABLE II

| | Specific Surface $m^2/g$ | Weight Percent | | | | | |
| --- | --- | --- | --- | --- | --- | --- | --- |
| | | Zeolite Content | $Al_2O_3$ | $SiO_2$ | $Na_2O$ | $Fe_2O$ | $TiO_2$ |
| AGZ-290 | 300 | 11.0 | 29.5 | 59.0 | 0.40 | 0.11 | 0.59 |
| GRZ-1 | 162 | 14.0 | 23.4 | 69.0 | 0.10 | 0.4 | 0.9 |
| CCZ-220 | 129 | 11.0 | 34.6 | 60.0 | 0.60 | 0.57 | 1.9 |
| Super DX | 155 | 13.0 | 31.0 | 65.0 | 0.80 | 0.57 | 1.6 |
| F-87 | 240 | 10.0 | 44.0 | 50.0 | 0.80 | 0.70 | 1.6 |
| FOC-90 | 240 | 8.0 | 44.0 | 52.0 | 0.65 | 0.65 | 1.1 |
| HFZ 20 | 310 | 20.0 | 59.0 | 40.0 | 0.47 | 0.54 | 2.75 |
| HEZ-55 | 210 | 19.0 | 59.0 | 35.2 | 0.60 | 0.60 | 2.5 |

The AGZ-290, GRZ-1, CCZ-220 and Super DX catalysts referred to above are products of W. R. Grace and Co. F-87 and FOC-90 are products of Filtrol, while HFZ-20 and HEZ-55 are products of Engelhard/Houdry. The above are properties of virgin catalyst and, except in the case of zeolite content, are adjusted to a water free basis, i.e. based on material ignited at 1750° F. The zeolite content is derived by comparison of the X-ray intensities of a catalyst sample and of a standard material composed of high purity sodium Y zeolite in accordance with draft #6, dated Jan. 9, 1978, of proposed ASTM Standard Method entitled "Determination of the Faujasite Content of a Catalyst." It is considered an advantage that the process of the present invention can be conducted in the substantial absence of tin and/or antimony or at least in the presence of a catalyst which is substantially free of either or both of these metals.

Additional Materials

The process of the present invention may be operated with the above described carbo-metallic oil and catalyst, and with $H_2O$ as substantially the only additional material charged to the reaction zone. But the charging of other additional materials is not excluded. The charging of recycled oil to the reaction zone has already been mentioned. As described in greater detail below, still other additional materials fulfilling a variety of functions may also be charged.

In general the $H_2O$ and other additional materials which may be used each perform one or more of the following functions which offer significant advantages over the process as performed with only the carbo-metallic oil and catalyst. Among these functions are: controlling the effects of heavy metals and other catalyst contaminants; enhancing catalyst activity; absorbing excess heat in the catalyst as received from the regenerator; disposal of pollutants or conversion thereof to a form or forms in which they may be more readily separated from products and/or disposed of; controlling catalyst temperature; diluting the carbo-metallic oil vapors to reduce their partial pressure and increase the yield of desired products; adjusting feed/catalyst contact time; donation of hydrogen to a hydrogen deficient carbo-metallic oil feedstock; assisting in the dispersion of the feed; and possibly also distillation of products. Certain of the metals in the heavy metals accumulation on the catalyst are more active in promoting undesired reactions when they are in the form of elemental metal, than they are when in the oxidized form produced by contact with oxygen in the catalyst regenerator. However, the time of contact between catalyst and vapors of feed and product in past conventional catalytic cracking was sufficient so that hydrogen released in the cracking reaction was able to reconvert a significant portion of the less harmful oxides back to the more harmful elemental heavy metals. One can take advantage of this situation through the introduction of additional materials which are in gaseous (including vaporous) form in the reaction zone in admixture with the catalyst and vapors of feed and products. The increased volume of material in the reaction zone resulting from the presence of such additional materials tends to increase the velocity of flow through the reaction zone with a corresponding decrease in the residence time of the catalyst and oxidized heavy metals borne thereby. Because of this reduced residence time, there is less opportunity for reduction of the oxidized heavy metals to elemental form and therefore less of the harmful elemental metals are available for contacting the feed and products.

Added materials may be introduced into the process in any suitable fashion, some examples of which follow. For instance, they may be admixed with the carbo-metallic oil feedstock prior to contact of the latter with the catalyst. Alternatively, the added materials may, if desired, be admixed with the catalyst prior to contact of the latter with the feedstock. Separate portions of the added materials may be separately admixed with both catalyst and carbo-metallic oil. Moreover, the feedstock, catalyst and additional materials may, if desired, be brought together substantially simultaneously. A portion of the added materials may be mixed with catalyst and/or carbo-metallic oil in any of the above described ways, while additional portions are subsequently brought into admixture. For example, a portion of the added materials may be added to the carbo-metallic oil and/or to the catalyst before they reach the reaction zone, while another portion of the added materials is introduced directly into the reaction zone. The added materials may be introduced at a plurality of spaced locations in the reaction zone or along the length thereof, if elongated.

The amount of additional materials which may be present in the feed, catalyst or reaction zone for carrying out the above functions, and others, may be varied as desired; but said amount will preferably be sufficient to substantially heat balance the process. These materials may for example be introduced into the reaction zone in a weight ratio relative to feed of up to about 0.4, preferably in the range of about 0.02 to about 0.4, more preferably about 0.03 to about 0.3 and most preferably about 0.05 to about 0.25.

Many or all of the above desirable functions may be attained by introducing $H_2O$ to the reaction zone in the form of liquid water alone or in combination with steam. Without wishing to be bound by any theory, it appears that the use of $H_2O$ tends to inhibit reduction of catalyst-borne oxides, sulfites and sulfides to the free metallic form which is believed to promote condensation-dehydrogenation with consequent promotion of coke and hydrogen yield and accompanying loss of product. Moreover, $H_2O$ may also, to some extent, reduce deposition of metals onto the catalyst surface. There may also be some tendency to desorb nitrogen-containing and other heavy contaminant-containing molecules from the surface of the catalyst particles, or at least some tendency to inhibit their absorption by the catalyst. It is also believed that added $H_2O$ tends to increase the acidity of the catalyst by Bronsted acid formation which in turn enhances the activity of the catalyst. Assuming the $H_2O$ as supplied is cooler than the regenerated catalyst and/or the temperature of the reaction zone, the sensible heat involved in raising the temperature of the $H_2O$ upon contacting the catalyst in the reaction zone or elsewhere can absorb excess heat from the catalyst. When the $H_2O$ is or includes recycled water that contains for example about 500 to about 5000 ppm of $H_2S$ dissolved therein, a number of additional advantages may accrue. The ecologically unattractive $H_2S$ need not be vented to the atmosphere, the recycled water does not require further treatment to remove $H_2S$ and the $H_2S$ may be of assistance in reducing coking of the catalyst by passivation of the heavy metals, i.e. by conversion thereof to the sulfide form which has a lesser tendency than the free metals to enhance coke and hydrogen production. In the reaction zone, the presence of $H_2O$ can dilute the carbo-metallic oil vapors, thus reducing their partial pressure and tending to increase the yield of the desired products. It has been reported that $H_2O$ is useful in combination with other materials in generating hydrogen during cracking; thus it may be able to act as a hydrogen donor for hydrogen deficient carbo-metallic oil feedstocks. The $H_2O$ may also serve certain purely mechanical functions such as: assisting in the atomizing or dispersion of the feed; competing with high molecular weight molecules for adsorption on the surface of the catalyst, thus interrupting coke formation; steam distillation of vaporizable product from unvaporized feed material; and disengagement of product from catalyst upon conclusion of the cracking reaction. It is particularly preferred to bring together $H_2O$, catalyst and carbo-metallic oil substantially simultaneously. For example, one may admix $H_2O$ and feedstock in an atomizing nozzle and immediately direct the resultant spray into contact with the catalyst at the upstream end of the reaction zone.

The addition of steam to the reaction zone is frequently mentioned in the literature of fluid catalytic cracking. Addition of liquid water to the feed is discussed relatively infrequently, compared to the introduction of steam directly into the reaction zone. However, in accordance with the present invention it is particularly preferred that liquid water be brought into intimate admixture with the carbo-metallic oil in a weight ratio of about 0.04 to about 0.15 at or prior to the time of introduction of the oil into the reaction zone, whereby the water (e.g., in the form of liquid water or in the form of steam produced by vaporization of liquid water in contact with the oil) enters the reaction zone as part of the flow of feedstock which enters such zone. Although not wishing to be bound by an theory, it is believed that the foregoing is advantageous in promoting dispersion of the feedstock. Also, the heat of vaporization of the water, which heat is absorbed from the catalyst, from the feedstock, or from both, causes the water to be a more efficient heat sink than steam alone. Preferably the weight ratio of liquid water to feed is about 0.04 to about 0.1, more preferably about 0.05 to about 0.1.

Of course, the liquid water may be introduced into the process in the above described manner or in other ways, and in either event the introduction of liquid water may be accompanied by the introduction of additional amounts of water as steam into the same or different portions of the reaction zone or into the catalyst and/or feedstock. For example, the amount of additional steam may be in a weight ratio relative to feed in the range of about 0.01 to about 0.25, with the weight ratio of total $H_2O$ (as steam and liquid water) to feedstock being about 0.3 or less. The charging weight ratio of liquid water relative to steam in such combined use of liquid water and steam may thus range from about 5 to about 0.2. Such ratio may be maintained at a predetermined level within such range or varied as necessary or desired to adjust or maintain the heat balance of the reaction.

Other materials may be added to the reaction zone to perform one or more of the above described functions. For example, the dehydrogenation-condensation activity of heavy metals may be inhibited by introducing hydrogen sulfide gas into the reaction zone. Hydrogen may be made available for hydrogen deficient carbo-metallic oil feedstocks by introducing into the reaction zone either a conventional hydrogen donor diluent such as a heavy naphtha or relatively low molecular weight carbon-hydrogen fragment contributors, including for example: light paraffins; low molecular weight alcohols and other compounds which permit or favor intermolecular hydrogen transfer; and compounds that chemically combine to generate hydrogen in the reaction zone such as by reaction of carbon monoxide with water, or with alcohols, or with olefins, or with other materials or mixtures of the foregoing.

All of the above mentioned additional materials (including water), alone or in conjunction with each other or in conjunction with other materials, such as nitrogen or other inert gases, light hydrocarbons, and others, may perform any of the above-described functions for which they are suitable, including without limitation, acting as diluents to reduce feed partial pressure and/or as heat sinks to absorb excess heat present in the catalyst as received from the regeneration step. The foregoing is a discussion of some of the functions which can be performed by materials other than catalyst and carbometallic oil feedstock introduced into the reaction zone, and it should be understood that other materials may be added or other functions performed without departing from the spirit of the invention.

Illustrative Apparatus

The invention may be practiced in a wide variety of apparatus. However, the preferred apparatus includes means for rapidly vaporizing as much feed as possible and efficiently admixing feed, water and catalyst (although not necessarily in that order), for causing the resultant mixture to flow as a dilute suspension in a progressive flow mode, and for separating the catalyst from cracked products and any uncracked or only partially cracked feed at the end of a predetermined residence time or times, it being preferred that all or at least a substantial portion of the product should be abruptly separated from at least a portion of the catalyst.

For example, the apparatus may include, along its elongated reaction chamber, one or more points for introduction of carbo-metallic feed, one or more points for introduction of catalyst, one or more points for introduction of additional materials including water, one or more points for withdrawal of products and one or more points for withdrawal of catalyst. The means for introducing feed, catalyst and other material may range from open pipes to sophisticated jets or spray nozzles, it being preferred to use means capable of breaking up the liquid feed into fine droplets. Preferably, the catalyst, liquid water (when used) and fresh feed are brought together in an apparatus similar to that disclosed in U.S. patent application Ser. No. 969,601 of George D. Myers et al, filed Dec. 14, 1978, the entire disclosure of which is hereby incorporated herein by reference.

It is preferred that the reaction chamber, or at least the major portion thereof, be more nearly vertical than horizontal and have a length to diameter ratio of at least about 10, more preferably about 20 or 25 or more. Use of a vertical riser type reactor is preferred. If tubular, the reactor can be of uniform diameter throughout or may be provided with a continuous or step-wise increase in diameter along the reaction path to maintain or vary the velocity along the flow path.

In general, the charging means (for catalyst, water and feed) and the reactor configuration are such as to provide a relatively high velocity of flow and dilute suspension of catalyst. For example, the vapor or catalyst velocity in the riser will be usually at least about 25 and more typically at least about 35 feet per second. This velocity may range up to about 55 or about 75 feet per second or higher. The velocity capabilities of the reactor will in general by sufficient to prevent substantial build-up of a catalyst bed in the bottom or other portions of the riser, whereby the catalyst loading in the riser can be maintained below about 4 or 5 pounds and below about 2 pounds per cubic foot, respectively, at the upstream (e.g. bottom) and downstream (e.g. top) ends of the riser.

The progressive flow mode involves, for example flowing of catalyst, feed and steam as a stream in a positively controlled and maintained direction established by the elongated nature of the reaction zone. This is not to suggest however that there must be strictly linear flow. As is well known, turbulent flow and "slippage" of catalyst may occur to some extent especially in certain ranges of vapor velocity and some catalyst loadings, although it has been reported adviseable to employ sufficiently low catalyst loadings to restrict slippage and back-mixing.

Most preferably the reactor is one which abruptly separates a substantial portion or all of the vaporized cracked products from the catalyst at one or more points along the riser, and preferably separates substantially all of the vaporized cracked products from the catalyst at the downstream end of the riser. A preferred type of reactor embodies ballistic separation of catalyst and products; that is, catalyst is projected in a direction established by the riser tube, and is caused to continue its motion in the general direction so established, while the products, having lesser momentum, are caused to make an abrupt change of direction, resulting in an abrupt, substantially instantaneous separation of product from catalyst. In a preferred embodiment preferred to as a vented riser, the riser tube is provided with a substantially unobstructed discharge opening at its downstream end for discharge of catalyst. An exit port in the side of the tube adjacent the downstream end receives the products. The discharge opening communicates with a catalyst flow path which extends to the usual stripper and regenerator, while the exit port communicates with a product flow path which is substantially or entirely separated from the catalyst flow path and leads to separation means for separating the products from the relatively small portion of catalyst, if any, which manages to gain entry to the product exit port. Examples of a ballistic separation apparatus and technique as above described, are found in U.S. Pat. Nos. 4,066,533 and 4,070,159 to Myers et al, the disclosures of which patents are hereby incorporated herein by reference in their entireties.

Preferred Operating Conditions

Preferred conditions for operation of the process are described below. Among these are feed, catalyst and reaction temperatures, reaction and feed pressures, residence time and levels of conversion, coke production and coke laydown on catalyst.

In conventional FCC operations with VGO, the feedstock is customarily preheated, often to temperatures significantly higher than are required to make the feed sufficiently fluid for pumping and for introduction into the reactor. For example, preheat temperatures as high as about 700° or 800° F. have been reported. But in our process as presently practiced it is preferred to restrict preheating of the feed, so that the feed is capable of absorbing a larger amount of heat from the catalyst while the catalyst raises the feed to conversion temperature, at the same time minimizing utilization of external fuels to heat the feedstock. Thus, where the nature of the feedstock permits, it may be fed at ambient temperature. Heavier stocks may be fed at preheat temperatures of up to about 600° F., typically about 200° F. to about 500° F., but higher preheat temperatures are not necessarily excluded.

The catalyst fed to the reactor may vary widely in temperature, for example from about 1100° to about 1600° F., more preferably about 1200° to about 1500° F. and most preferably about 1300° to about 1400° F., with about 1325° to about 1375° being considered optimum at present.

As indicated previously, the conversion of the carbo-metallic oil to lower molecular weight products may be conducted at a temperature of about 900° to about 1400° F., measured at the reaction chamber outlet. The reaction temperature as measured at said outlet is more preferably maintained in the range of about 975° to about 1300° F., still more preferably about 985° to about 1200° F., and most preferably about 1000° to about 1150° F. Depending upon the temperature selected and the properties of the feed, all of the feed may or may not vaporize in the riser.

Although the pressure in the reactor may, as indicated above, range from about 10 to about 50 psia, preferred and more preferred pressure ranges are about 15 to about 35 and about 20 to about 35. In general, the partial (or total) pressure of the feed may be in the range of about 3 to about 30, more preferably about 7 to about 25 and most preferably about 10 to about 17 psia. The feed partial pressure may be controlled or suppressed by the introduction of gaseous (including vaporous) materials into the reactor, such as for instance the steam, water, and other additional materials described above. The process has for example been operated with the ratio of feed partial pressure relative to total pressure in the riser in the range of about 0.2 to about 0.8, more typically about 0.3 to about 0.7 and still more typically about 0.4 to about 0.6, with the ratio of the partial pressure of added gaseous material (which includes the steam resulting from introduction of $H_2O$ to the riser and may also include recycled gases) relative to total pressure in the riser correspondingly ranging from about 0.8 to about 0.2, more typically about 0.7 to about 0.3 and still more typically about 0.6 to about 0.4. In the illustrative operations just described, the ratio of the partial pressure of the added gaseous material relative to the partial pressure of the feed has been in the range of about 0.25 to about 4, more typically about 0.4 to about 2.3 and still more typically about 0.7 to about 1.7.

Although the residence time of feed and product vapors in the riser may be in the range of about 0.5 to about 10 seconds, preferred and more preferred values are about 0.5 to about 6 and about 1 to about 4 seconds, with about 1.5 to about 3.0 seconds currently being considered about optimum. For example, the process has been operated with a riser vapor residence time of about 2.5 seconds or less by introduction of copious amounts of gaseous materials into the riser, such amounts being sufficient to provide for example a partial pressure ratio of added gaseous materials relative to hydrocarbon feed of about 0.8 or more. By way of further illustration, the process has been operated with said residence time being about two seconds or less, with the aforesaid ratio being in the range of about 1 to about 2. The combination of low feed partial pressure, very low residence time and ballistic separation of products from catalyst are considered especially benefical for the conversion of carbo-metallic oils.

Additional benefits may be obtained in the foregoing combination when there is a substantial partial pressure of added gaseous material, especially $H_2O$, as described above. In the process of the present invention, an oil feed having a relatively high level of coke precursors and/or heavy metals, i.e., a carbon residue upon pyrolysis of at least about 1 and/or a level of heavy metal(s) of at least about 5.5 ppm by weight of Nickel Equivalents, is contact by water and a conversion catalyst. The catalyst has deposited thereon at least about 3,000 ppm, preferably at least about 4,000 ppm, by weight combined heavy metal(s) expressed as Nickel Equivalents on regenerated equilibrium catalyst. At least a portion of the water added may be recycled water from a prior catalytic cracking of an oil feedstock containing a residual oil. The water which is recovered and recycled from residual oil cracking normally contains from 500 to 5,000 ppm of $H_2S$ dissolved therein. In practicing the present invention, the recycled water preferably contains at least 100 ppm, and more preferably at least 1,000 ppm, of $H_2S$ dissolved therein.

It is essential that all of the water, whether in liquid or gaseous form, which is added to the reaction contains less than about 100 ppm of sodium and less than about 500 ppm each of calcium and magnesium. The sodium content is preferably less than 25 ppm. Accordingly, water from certain sources which might be present at the site of the reactor unit, such as boilers, should not be employed unless their content of sodium, calcium, and/or magnesium is reduced. These alkaline earth metals are known to deactivate zeolite catalysts as discussed elsewhere in this specification.

The amount of water added in the lower region of the reaction zone is generally about 1 to about 25% by weight, and preferably about 5 to about 15% by weight, based upon the weight of the residual oil in the feed. In addition, the temperature of the water added is preferably from about normal room temperature (e.g., about 25° C.) to less than about 100° C. By adding the water in the liquid phase rather than as steam, it is believed that the water helps to break up or cause misting of the hydrocarbon in the presence of the regenerated catalyst particles, which in turn provides for greater surface contact of the catalyst with the feed.

Depending upon whether there is slippage between the catalyst and hydrocarbon vapors in the riser, the catalyst riser residence time may or may not be the same as that of the vapors. Thus, the ratio of average catalyst reactor residence time versus vapor reactor residence time, i.e. slippage, may be in the range of about 1 to about 5, more preferably about 1 to about 4 and most preferably about 1.2 to about 3, with about 1.2 to about 2 currently being considered optimum.

In certain types of known FCC units, there is a riser which discharges catalyst and product vapors together into an enlarged chamber, usually considered to be part of the reactor, in which the catalyst is disengaged from product and collected. Continued contact of catalyst, uncracked feed (if any) and cracked products in such enlarged chamber results in an overall catalyst feed contact time appreciably exceeding the riser tube residence times of the vapors and catalysts. When practicing the process of the present invention with ballistic separation of catalyst and vapors at the downstream (e.g. upper) extremity of the riser, such as is taught in the above mentioned Myers et al patents, the riser residence time and the catalyst contact time are substantially the same for a major portion of the feed and product vapors. It is considered advantageous if the vapor riser residence time and vapor catalyst contact time are substantially the same for at least about 80%, more preferably at least about 90% and most preferably at least about 95% by volume of the total feed and product vapors passing through the riser. By denying such vapors continued contact with catalyst in a catalyst disengagement and collection chamber one may avoid a tendency toward re-cracking and diminished selectivity.

In general, the combination of catalyst to oil ratio, temperatures, pressures and residence times should be such as to effect a substantial conversion of the carbo-metallic oil feedstock. It is an advantage of the process that very high levels of conversion can be attained in a single pass; for example the conversion may be in excess of 60% and may range to about 90% or higher. Preferably, the aforementioned conditions are maintained at levels sufficient to maintain conversion levels in the range of about 60 to about 90% and more preferably about 70 to about 85%. The foregoing conversion levels are calculated by subtracting from 100% the percentage obtained by dividing the liquid volume of fresh feed into 100 times the volume of liquid product boiling at and above 430° F. (tbp, standard atmospheric pressure).

These substantial levels of conversion may and usually do result in relatively large yields of coke, such as for example about 6 to about 14% by weight based on fresh feed, more commonly about 6 to about 12% and most frequently about 6 to about 10%. The coke yield can more or less quantitatively deposit upon the catalyst. At contemplated catalyst to oil ratios, the resultant coke laydown may be in excess of about 0.3, more commonly in excess of about 0.5 and very frequently in excess of about 1% of coke by weight, based on the weight of moisture free regenerated catalyst. Such coke laydown may range as high as about 2%, or about 3%, or even higher.

In common with conventional FCC operations on VGO, the present process includes stripping of spent catalyst after disengagement of the catalyst from product vapors. Persons skilled in the art are acquainted with appropriate stripping agents and conditions for stripping spent catalyst, but in some cases the present process may require somewhat more severe conditions than are commonly employed. This may result, for example, from the use of a carbo-metallic oil having constituents which do not volatilize under the conditions prevailing in the reactor, which constituents deposit themselves at least in part on the catalyst. Such adsorbed, unvaporized material can be troublesome from at least two standpoints. First, if the gases (including vapors) used to strip the catalyst can gain admission to a catalyst disengagement or collection chamber connected to the downstream end of the riser, and if there is an accumulation of catalyst in such chamber, vaporization of these unvaporized hydrocarbons in the stripper can be followed by adsorption on the bed of catalyst in the chamber. More particularly, as the catalyst in the stripper is stripped of adsorbed feed material, the resultant feed material vapors pass through the bed of catalyst accumulated in the catalyst collection and/or disengagement chamber and may deposit coke and/or condensed material on the catalyst in said bed. As the catalyst bearing such deposits moves from the bed and into the stripper and from thence to the regenerator, the condensed products can create a demand for more stripping capacity, while the coke can tend to increase regeneration temperatures and/or demand greater regeneration capacity. For the foregoing reasons, it is preferred to prevent or restrict contact between stripping vapors and catalyst accumulations in the catalyst disengagement or collection chamber. This may be done for example by preventing such accumulations from forming, e.g. with the exception of a quantity of catalyst which essentially drops out of circulation and may remain at the bottom of the disengagement and/or collection chamber, the catalyst that is in circulation may be removed from said chamber promptly upon settling to the bottom of the chamber. Also, to minimize regeneration temperatures and demand for regeneration capacity, it may be desirable to employ conditions of time, temperature and atmosphere in the stripper which are sufficient to reduce potentially volatile hydrocarbon material borne by the stripped catalyst to about 10% or less by weight of the total carbon loading on the catalyst. Such stripping may for example include reheating of the catalyst, extensive stripping with steam, the use of gases having a temperature considered higher than normal for FCC/VGO operations, such as for instance flue gas from the regenerator, as well as other refinery stream gases such as hydrotreater off-gas ($H_2S$ containing), hydrogen and others. For example, the stripper may be operated at a temperature of about 1025° F. or higher.

Substantial conversion of carbo-metallic oils to lighter products in accordance with the invention tends to produce sufficiently large coke yields and coke laydown on catalyst to require some care in catalyst regeneration. In order to maintain adequate activity in zeolite and non-zeolite catalysts, it is desirable to regenerate the catalyst under conditions of time, temperature and atmosphere sufficient to reduce the percent by weight of carbon remaining on the catalyst to about 0.25% or less. Preferably this weight percentage is about 0.1% or less and more preferably about 0.05% or less, especially with zeolite catalysts. The amounts of coke which must therefore be burned off of the catalysts when processing carbometallic oils are usually substantially greater than would be the case when cracking VGO. The term coke when used to describe the present invention, should be understood to include any residual unvaporized feed or cracking product, if any such material is present on the catalyst after stripping.

Regeneration of catalyst, burning away of coke deposited on the catalyst during the conversion of the feed, may be performed at any suitable temperature in the range of about 1100° to about 1600° F., measured at the regenerator catalyst outlet. This temperature is preferably in the range of about 1200° to about 1500° F., more preferably about 1275° to about 1425° F. and optimally about 1325° to about 1375° F. The process has been operated, for example, with a fluidized regenerator with the temperature of the catalyst dense phase in the range of about 1300° to about 1400° F.

When regenerating catalyst to very low levels of carbon on regenerated catalyst, e.g. about 0.1% or less or about 0.05% or less, based on the weight of regenerated catalyst, it is acceptable to burn off at least about the last 10% or at least about the last 5% by weight of coke (based on the total weight of coke on the catalyst immediately prior to regeneration) in contact with combustion producing gases containing excess oxygen. In this connection it is contemplated that some selected portion of the coke, ranging from all of the coke down to about the last 5 or 10% by weight, can be burned with excess oxygen. By excess oxygen is meant an amount in excess of the stoichiometric requirement for burning all of the hydrogen, all of the carbon and all of the other combustible components, if any, which are present in the above-mentioned selected portion of the coke immediately prior to regeneration. The gaseous products of combustion conducted in the presence of excess oxygen will normally include an appreciable amount of free oxygen. Such free oxygen, unless removed from the by-product gases or converted to some other form by a means or process other than regeneration, will normally manifest itself as free oxygen in the flue gas from the regenerator unit. In order to provide sufficient driving force to complete the combustion of coke to low levels, when burning all or a major portion of the coke with excess oxygen, the amount of free oxygen will normally be not merely appreciable but substantial, i.e. there will be a concentration of at least about 2 mole percent of free oxygen in the total regeneration flue gas recovered from the entire, completed regeneration operation. While such technique is effective in attaining the desired low levels of carbon on regenerated catalyst, it has its limitations and difficulties as will become apparent from the discussion below.

As conventionally practiced, the burning of coke during regeneration produces some $H_2O$ because of the small amount of hydrogen normally found in coke; but carbon monoxide and carbon dioxide are generally regarded as the principal products. The conversion of the carbon content of coke to carbon monoxide and carbon dioxide are highly exothermic reactions. For instance the reaction of oxygen with coke to produce carbon dioxide produces 14,108 BTUs per pound of coke, while the reaction of oxygen with coke or carbon to form carbon monoxide produces approximately 3967 BTUs per pound of coke. The larger the amount of coke which must be burned from a given weight of catalyst, the greater the amount of heat released during combustion in the regenerator.

Heat released by combustion of coke in the regenerator is absorbed by the catalyst and can be readily retained thereby until the regenerated catalyst is brought into contact with fresh feed. When processing carbo-metallic oils to the relatively high levels of conversion involved in the present invention, the amount of regenerator heat which is transmitted to fresh feed by way of recycling regenerated catalyst can substantially exceed the level of heat input which is appropriate in the riser for heating and vaporizing the feed and other materials, for supplying the endothermic heat of reaction for cracking, for making up the heat losses of the unit and so forth. Thus, in accordance with the invention, the amount of regenerator heat transmitted to fresh feed may be controlled, or restricted where necessary, within certain approximate ranges. The amount of heat so transmitted may for example be in the range of about 500 to about 1200, more particularly about 600 to about 900, and more particularly about 650 to about 850 BTUs per pound of fresh feed. The aforesaid ranges refer to the combined heat, in BTUs per pound of fresh feed, which is transmitted by the catalyst to the feed and reaction products (between the contacting of feed with catalyst and the separation of product from catalyst) for supplying the heat of reaction (e.g. for cracking) and the difference in enthalpy between the products and the fresh feed. Not included in the foregoing are the heat made available in the reactor by the adsorption of coke on the catalyst, nor the heat consumed by heating, vaporizing or reacting recycle streams and such added materials as water, steam, naphtha and other hydrogen donors, flue gases and inert gases, or by radiation and other losses.

One or a combination of techniques may be utilized in this invention for controlling or restricting the amount of regeneration heat transmitted via catalyst to fresh feed. For example, one may add a combustion promoter to the cracking catalyst in order to reduce the temperature of combustion of coke to carbon dioxide and/or carbon monoxide in the regenerator. Moreover, one may remove heat from the catalyst through heat exchange means, including for example heat exchangers (e.g. steam coils) built into the regenerator itself, whereby one may extract heat from the catalyst during regeneration. Heat exchangers can be built into catalyst transfer lines, such as for instance the catalyst return line from the regenerator to the reactor, whereby heat may be removed from the catalyst after it is regenerated. The amount of heat imparted to the catalyst in the regenerator may be restricted by reducing the amount of insulation on the regenerator to permit some heat loss to the surrounding atmosphere, especially if feeds of exceedingly high coking potential are planned for processing; in general, such loss of heat to the atmosphere is considered economically less desirable than certain of the other alternatives set forth herein. One may also inject cooling fluids into the regenerator, for example water and/or steam, whereby the amount of inert gas available in the regenerator for heat absorption and removal is increased.

Another suitable and preferred technique for controlling or restricting the heat transmitted to fresh feed via recycled regenerated catalyst involves maintaining a specified ratio between the carbon dioxide and carbon monoxide formed in the regenerator while such gases are in heat exchange contact or relationship with catalyst undergoing regeneration. In general, all or a major portion by weight of the coke present on the catalyst immediately prior to regeneration is removed in at least one combustion zone in which the aforesaid ratio is controlled as described below. More particularly, at least the major portion more preferably at least about 65% and more preferably at least about 80% by weight of the coke on the catalyst is removed in a combustion zone in which the molar ratio of $CO_2$ to $CO$ is maintained at a level substantially below 5, e.g. about 4 or less. Looking at the $CO_2/CO$ relationship from the inverse standpoint, it is preferred that the $CO/CO_2$ molar ratio should be at least about 0.25 and preferably at least about 0.3 and still more preferably about 1 or more or even 1.5 or more. While persons skilled in the art are aware of techniques for inhibiting the burning of $CO$ to $CO_2$, it has been suggested that the mole ratio of $CO:CO_2$ should be kept less than 0.2 when regenerating catalyst with large heavy metal accumulations resulting from the processing of carbo-metallic oils; in this connection see for example U.S. Pat. No. 4,162,213 to Zrinscak, Sr. et al. In this invention however, maximizing CO production while regenerating catalyst to about 0.1% carbon or less, and preferably about 0.05% carbon or less, is a particularly preferred embodiment of this invention. Moreover, according to a preferred method of carrying out the invention the sub-process of regeneration, as a whole, may be carried out to the above-mentioned low levels of carbon on regenerated catalyst with a deficiency of oxygen; more specifically, the total oxygen supplied to the one or more stages of regeneration can be and preferably is less than the stoichiometric amount which would be required to burn all hydrogen in the coke to $H_2O$ and burn all carbon in the coke to $CO_2$. If the coke includes other combustibles, the aforementioned stoichiometric amount is adjusted to include the amount of oxygen required to burn them.

Still another particularly preferred technique for controlling or restricting the regeneration heat imparted to fresh feed via recycled catalyst involves the diversion of a portion of the heat borne by recycled catalyst to added materials introduced into the reactor, such as the water, steam, naphtha, other hydrogen donors, flue gases, inert gases, and other gaseous or vaporizable materials which may be introduced into the reactor.

The larger the amount of coke which must be burned from a given weight of catalyst, the greater the potential for exposing the catalyst to excessive temperatures. Many otherwise desirable and useful cracking catalysts are particularly susceptible to deactivation at high temperatures, and among these are quite a few of the costly molecular sieve or zeolite types of catalyst. The crystal structures of zeolites and the pore structures of the catalyst carriers generally are somewhat susceptible to thermal and/or hydrothermal degradation. The use of such catalysts in catalytic conversion processes for carbo-metallic feeds creates a need for regeneration techniques which will not destroy the catalysts by exposure to highly severe temperatures and steaming. Such need can be met by a multi-stage regeneration process which includes conveying spent catalyst into a first regeneration zone and introducing oxidizing gas thereto. The amount of oxidizing gas that enters said first zone and the concentration of oxygen or oxygen bearing gas therein are sufficient for only partially effecting the desired conversion of coke on the catalyst to carbon oxide gases. The partially regenerated catalyst is then removed from the first regeneration zone and is conveyed to a second regeneration zone. Oxidizing gas is introduced into the second regeneration zone to provide a higher concentration of oxygen or oxygen-containing gas than in the first zone, to complete the removal of carbon to the desired level. The regenerated catalyst may then be removed from the second zone and recycled to the reactor for contact with fresh feed. An example of such multi-stage regeneration process is described in U.S. patent application Ser. No. 969,602 of George D. Myers et al, filed Dec. 14, 1978, the entire disclosure of which is hereby incorporated herein by reference. Another example may be found in U.S. Pat. No. 2,398,739.

Multi-stage regeneration offers the possibility of combining oxygen deficient regeneration with the control of the $CO:CO_2$ molar ratio. Thus, about 50% or more, more preferably about 65% to about 95%, and more preferably about 80% to about 95% by weight of the coke on the catalyst immediately prior to regeneration may be removed in one or more stages of regeneration in which the molar ratio of $CO:CO_2$ is controlled in the manner described above. In combination with the foregoing, the last 5% or more, or 10% or more by weight of the coke originally present, up to the entire amount of coke remaining after the preceding stage or stages, can be removed in a subsequent stage of regeneration in which more oxygen is present. Such process is susceptible of operation in such a manner that the total flue gas recovered from the entire, completed regneration operation contains little or no excess oxygen, i.e. on the order of about 0.2 mole percent or less, or as low as about 0.1 mole percent or less, which is substantially less than the 2 mole percent which has been suggested elsewhere. Thus, multi-stage regeneration is particularly beneficial in that it provides another convenient technique for restricting regeneration heat transmitted to fresh feed via regenerated catalyst and/or reducing the potential for thermal deactivation, while simultaneously affording an opportunity to reduce the carbon level on regenerated catalyst to those very low percentages (e.g. about 0.1% or less) which particularly enhance catalyst activity. Moreover, where the regeneration conditions, e.g. temperature or atmosphere, are substantially less severe in the second zone than in the first zone (e.g. by at least about 10 and preferably at least about 20° F.), that part of the regeneration sequence which involves the most severe conditions is performed while there is still an appreciable amount of coke on the catalyst. Such operation may provide some protection of the catalyst from the more severe conditions. A particularly preferred embodiment of the invention is two-stage fluidized regeneration at a maximum temperature of about 1500° F. with a reduced temperature of at least about 10° or 20° F. in the dense phase of the second stage as compared to the dense phase of the first stage, and with reduction of carbon on catalyst to about 0.05% or less or even about 0.025% or less by weight in the second zone. In fact, catalyst can readily be regenerated to carbon levels as low as 0.01% by this technique, even though the carbon on catalyst prior to regeneration is as much as about 1%.

In most circumstances, it will be important to insure that no adsorbed oxygen containing gases are carried into the riser by recycled catalyst. Thus, whenever such action is considered necessary, the catalyst discharged from the regenerator may be stripped with appropriate stripping gases to remove oxygen containing gases. Such stripping may for instance be conducted at relatively high temperatures, for example about 1350° to about 1370° F., using steam, nitrogen or other inert gas as the stripping gas(es). The use of nitrogen and other inert gases is beneficial from the standpoint of avoiding a tendency toward hydro-thermal catalyst deactivation which may result from the use of steam.

The following comments and discussion relating to metals management, carbon management and heat management may be of assistance in obtaining best results when operating the invention. Since these remarks are for the most part directed to what is considered the best mode of operation, it should be apparent that the invention is not limited to the particular modes of operation discussed below. Moreover, since certain of these comments are necessarily based on theoretical considerations, there is no intention to be bound by any such theory, whether expressed herein or implicit in the operating suggestions set forth hereinafter.

Although discussed separately below, it is readily apparent that metals management, carbon management and heat mangement are inter-related and interdependent subjects both in theory and practice. While coke yield and coke laydown on catalyst are primarily the result of the relatively large quantities of coke precursors found in carbo-metallic oils, the production of coke is exacerbated by high metals accumulations, which can also significantly affect catalyst performance. Moreover, the degree of success experienced in metals management and carbon management will have a direct influence on the extent to which heat management is necessary. Moreover, some of the steps taken in support of metals management have proved very helpful in respect to carbon and heat management.

As noted previously the presence of a large heavy metals accumulation on the catalyst tends to aggravate the problem of dehydrogenation and aromatic condensation, resulting in increased production of gases and coke for a feedstock of a given Ramsbottom carbon value. The introduction of substantial quantities of $H_2O$ into the reactor, either in the form of steam or liquid water, appears highly beneficial from the standpoint of keeping the heavy metals in a less harmful form, i.e. the oxide rather than metallic form. This is of assistance in maintaining the desired selectivity.

Also, a unit design in which system components and residence times are selected to reduce the ratio of catalyst reactor residence time relative to catalyst regenerator residence time will tend to reduce the ratio of the times during which the catalyst is respectively under reduction conditions and oxidation conditions. This too can assist in maintaining desired levels of selectivity.

Whether the metals content of the catalyst is being managed successfully may be observed by monitoring the total hydrogen plus methane produced in the reactor and/or the ratio of hydrogen to methane thus produced. In general, it is considered that the hydrogen to methane mole ratio should be less than about 1 and preferably about 0.6 or less, with about 0.4 or less being considered about optimum.

Careful carbon management can improve both selectivity, (the ability to maximize production of valuable products) and heat productivity. In general, the techniques of metals control described above are also of assistance in carbon management. The usefulness of water addition in respect to carbon management has already been spelled out in considerable detail in that part of the specification which relates to added materials for introduction into the reaction zone. In general, those techniques which improve dispersion of the feed in the reaction zone should also prove helpful; these include for instance the use of fogging or misting devices to assist in dispersing the feed.

Catalyst to oil ratio is also a factor in heat management. In common with prior FCC practice on VGO, the reactor temperature may be controlled in the practice of the present invention by respectively increasing or decreasing the flow of hot regenerated catalyst to the reactor in response to decreases and increases in reactor temperature, typically the outlet temperature in the case of a riser type reactor. Where the automatic controller for catalyst introduction is set to maintain an excessive catalyst to oil ratio, one can expect unnecessarily large rates of carbon production and heat release, relative to the weight of fresh feed charged to the reaction zone.

Relatively high reactor temperatures are also beneficial from the standpoint of carbon management. Such higher temperatures foster more complete vaporization of feed and disengagement of product from catalyst.

Carbon management can also be facilitated by suitable restriction of the total pressure in the reactor and the partial pressure of the feed. In general, at a given level of conversion, relatively small decreases in the aforementioned pressures can substantially reduce coke production. This may be due to the fact that restricting total pressure tends to enhance vaporization of high boiling components of the feed, encourage cracking and facilitate disengagement of both unconverted feed and higher boiling cracked products from the catalyst. It may be of assistance in this regard to restrict the pressure drop of equipment downstream of and in communication with the reactor. But if it is desired or necessary to operate the system at higher total pressure, such as for instance because of operating limitations (e.g. pressure drop in downstream equipment) the above described benefits may be obtained by restricting the feed partial pressure. Suitable ranges for total reactor pressure and feed partial pressure have been set forth above, and in general it is desirable to attempt to minimze the pressures within these ranges.

The abrupt separation of catalyst from product vapors and unconverted feed (if any) is also of great assistance. It is for this reason that the so-called vented riser apparatus and technique disclosed in U.S. Pat. Nos. 4,070,159 and 4,066,533 to George D. Myers et al is the preferred type of apparatus for conducting this process. For similar reasons, it is beneficial to reduce insofar as possible the elapsed time between separation of catalyst from product vapor and the commencement of stripping. The vented riser and prompt stripping tend to reduce the opportunity for coking of unconverted feed and higher boiling cracked products adsorbed on the catalyst.

A particularly desirable mode of operation from the standpoint of carbon management is to operate the process in the vented riser using a hydrogen donor if necessary, while maintaining the feed partial pressure and total reactor pressure as low as possible, and incorporating relatively large amounts of water, steam and if desired, other diluents, which provide the numerous benefits discussed in greater detail above. Moreover, when liquid water, steam, hydrogen donors, hydrogen and other gaseous or vaporizable materials are fed to the reaction zone, the feeding of these materials provides an opportunity for exercising additional control over catalyst to oil ratio. Thus, for example, the practice of increasing or decreasing the catalyst to oil ratio for a given amount of decrease or increase in reactor temperature may be reduced or eliminated by substituting either appropriate reduction or increase in the charging ratios of the water, steam and other gaseous or vaporizable material, or an appropriate reduction or increase in the ratio of water to steam and/or other gaseous materials introduced into the reaction zone.

Heat management includes measures taken to control the amount of heat released in various parts of the process and/or for dealing successfully with such heat as may be released. Unlike conventional FCC practice using VGO, wherein it is usually a problem to generate sufficient heat during regeneration to heat balance the reactor, the processing of carbo-metallic oils generally produces so much heat as to require careful management thereof.

Heat management can be facilitated by various techniques associated with the materials introduced into the reactor. Thus, heat absorption by feed can be maximized by minimum preheating of feed, it being necessary only that the feed temperature be high enough so that it is sufficiently fluid for successful pumping and dispersion in the reactor. When the catalyst is maintained in a highly active state with the suppression of coking (metals control), so as to achieve higher conversion, the resultant higher conversion and greater selectivity can increase the heat absorption of the reaction. In general, higher reactor temperatures promote catalyst conversion activity in the face of more refractory and higher boiling constituents with high coking potentials. While the rate of catalyst deactivation may thus be increased, the higher temperature of operation tends to offset this loss in activity. Higher temperatures in the reactor also contribute to enhancement of octane number, thus off-setting the octane depressant effect of high carbon lay down. Other techniques for absorbing heat have also been discussed above in connection with the introduction of water, steam, and other gaseous or vaporizable materials into the reactor.

The severe stripping and various regeneration techniques discussed above are useful in controlling heat release in the regenerator. While removal of heat from catalyst in or downstream of the regenerator by means of heat exchangers (including steam coils) has been suggested as a means for controlling heat release, the above described techniques of multi-stage regeneration and control over the $CO/CO_2$ ratio (in either single or multi-stage regeneration) are considered more advantageous. The use of steam coils is considered to be partly self-defeating, in that a steam coil or heat exchanger in the regenerator or catalyst return line will generally cause an increase in the catalyst to oil ratio with a resultant increase in the rates of carbon production in the reactor and heat release in the regenerator.

Illustrative Embodiments

As noted above, the invention can be practiced in the above described modes and many others. Two illustrative, non-limiting examples are described by the accompanying schematic diagrams in FIGS. 1 and 2 and by the descriptions of those figures which follow.

FIG. 1 is a schematic diagram of an apparatus for carrying out the process of the present invention. The carbometallic oil feed (which may have been heated in a feed preheater not shown) and water supplied through delivery pipe 9, are fed by feed supply pipe 10 having a control valve 11 to a wye 12 in which they mix with a flow of catalyst delivered through supply pipe 13 and controlled by valve 14. Of course a variety of mixing arrangements may be employed, and provisions may be made for introducing the other added materials discussed above. The mixture of catalyst and feed, with or without other additional materials, is then introduced into riser 18.

Although riser 18 appears vertical in the drawing, persons skilled in the art will recognize that the riser and not be vertical, as riser type reactors are known in which an appreciable portion of the riser pipe is non-vertical. Thus, riser pipes having an upward component of direction are contemplated, and usually the upward component of their upwardly flowing inclined portions is substantial, i.e. at least about 30°. It is also known to provide risers which have downwardly flowing inclined or vertical portions, as well as horizontal portions. Folded risers are also known, in which there are both upwardly extending and downwardly extending segments. Moreover, it is entirely feasible to practice the process of the invention in an inclined and/or vertical pipe in which the feed and catalyst are introduced at an upper elevation and in which the feed and catalyst moves under the influence of gravity and the down flow of the feed to a lower elevation. Thus, in general, the invention contemplates the use of reaction chambers having a long L/D ratio and having a significant deviation from horizontal.

At the upper end of the riser 18 is a chamber 19 which receives the catalyst from the riser. While chamber 19 may be a conventional disengagement and collection chamber, it is preferred that means be provided for causing product vapors to undergo a sufficient change of direction relative to the direction traveled by the catalyst particles, whereby the vapors are suddenly and effectively separated from the catalyst. Preferably, there is "ballistic" separation of catalyst particles and product vapors as described above.

In the present schematic diagram, the disengagement chamber 19 includes an upward extension 20 of riser pipe 18 having an open top 21 through which the catalyst particles are discharged. This embodiment makes use of the so-called vented riser described in the above-mentioned Myers et al patents. Because of the refractory nature of carbo-metallic fractions, relatively high severity is required, but the rapid disengagement of catalyst from lighter cracked products in the vented riser prevents overcracking of desirable liquid products such as gasoline to gaseous products. The product vapors are caused to undergo a sudden change of direction into lateral port 22 in the side of riser extension 20, the catalyst particles being, for the most part, unable to follow the product vapors into port 22.

The vapors and those few particles which do manage to follow them into port 22 are transferred by cross pipe 23 to a cyclone separator 24. It is an advantage of the vented riser system shown that it can function satisfactorily with a single stage cyclone separator. However, in the present embodiment the cyclone separator 24 is employed as a first stage cyclone separator which is connected via transfer pipe 17 with optional secondary cyclone separator 25. The cyclone separator means, whether of the single- or multi-stage type, separates from the product vapors those small amounts of catalyst which do enter the lateral port 22. Product vapors are discharged from disengagement chamber 19 through product discharge pipe 26.

The catalyst particles which discharge from open top 21 of riser pipe extension 20, and those catalyst particles which are discharged from the discharge legs 27 and 28 of primary and secondary cyclones 24 and 25 drop to the bottom of disengagement chamber 19. The inventory and residence time of catalyst in chamber 19 are preferably minimized. During startup those catalyst particles which are present may be kept in suspension by fluffing jets 30 supplied with steam through steam supply pipe 29. Spent catalyst spilling over from the bottom of disengagement chamber 19 passes via drop leg 31 to a stripper chamber 32 equipped with baffles 33 and steam jet 34. Any of the other stripping gases referred to above may be employed with or in place of the steam.

Carbon is burned from the surface of the catalyst in the combustor 38 which receives stripped catalyst via downcomer pipe 39 and control valve 40. Blowers 41 and 42, in association with a valve and piping arrangement generally indicated by 44, supply air to combustion air jets 48 at the bottom of the combustor and to fluffing jets 49 at an elevated position. Air preheater 43, although usually unused when processing heavy hydrocarbons in accordance with the invention, may be employed when starting up the unit on VGO; then, when the unit is switched over to the carbo-metallic feed, preheater operation may be discontinued (or at least reduced). Supplemental fuel means may be provided to supply fuel through the combustion air jets 48; but such is usually unnecessary since the carbon lay down on the catalyst supplies more than enough fuel to maintain the requisite temperatures in the regeneration section. Regenerated catalyst, with most of the carbon burned off, departs the combustor through an upper outlet 50 and cross pipe 51 to a secondary chamber 52, where it is deflected into the lower portion of the chamber by a baffle 53. Although the use of two stage regeneration is contemplated, and preferred, in this particular embodiment the secondary chamber 52 was operated primarily as a separator chamber, although it can be used to remove additional carbon down to about 0.01% or less in the final stages of regeneration.

Catalyst moves in up to three different directions from the secondary chamber 52. A portion of the catalyst may be circulated back to combustor 38 via catalyst recirculation loop 55 and control valve 56 for heat control in the combustor. Some of the catalyst is entrained in the product gases, such as CO and/or $CO_2$ produced by burning the carbon on the catalyst in the combustor, and the entrained catalyst fines pass upwardly in chamber 52 to two sets of primary and secondary cyclones generally indicated by 57 and 58 which separate these catalyst fines from the combustion gases. Catalyst collected in the cyclones 57,58 and discharged through their drop legs is directed to the bottom of chamber 52 where catalyst is kept in suspension by inert gas and/or steam jets 59 and by a baffle arrangement 54, the latter facilitating discharge or regenerated catalyst through outlet 69 to catalyst supply pipe 13 through which it is recirculated for contact with fresh feed at wye 12, as previously described.

Combustion product gases produced by regeneration of the catalyst and separated from entrained catalyst fines by the sets 57,58 of primary and secondary cyclones in chamber 52, discharge through effluent pipes 61,62 and heat exchangers 60,63. If such gases contain significant amounts of CO, they may be sent via gas supply pipe 64 to an optional furnace 65 in which the CO is burned to heat heating coil 66 connected with steam boiler 67. Additional heat may be supplied to the contents of the boilers through conduit loop 68, which circulates fluid from the boiler 67 to heat exchangers 60,63 and back to the boiler. This is of course only one example of many possible regeneration arrangements which may be employed. The amount of heat passed from the regenerator back to the riser via regenerated catalyst may be controlled in any of the other ways described above; however it is preferred to control the relative proportions of carbon monoxide and carbon dioxide produced while the catalyst is in heat exchange relationship with the combustion gases resulting from regeneration. An example of this technique is disclosed in the particularly preferred embodiment described in FIG. 2.

Figure 2:
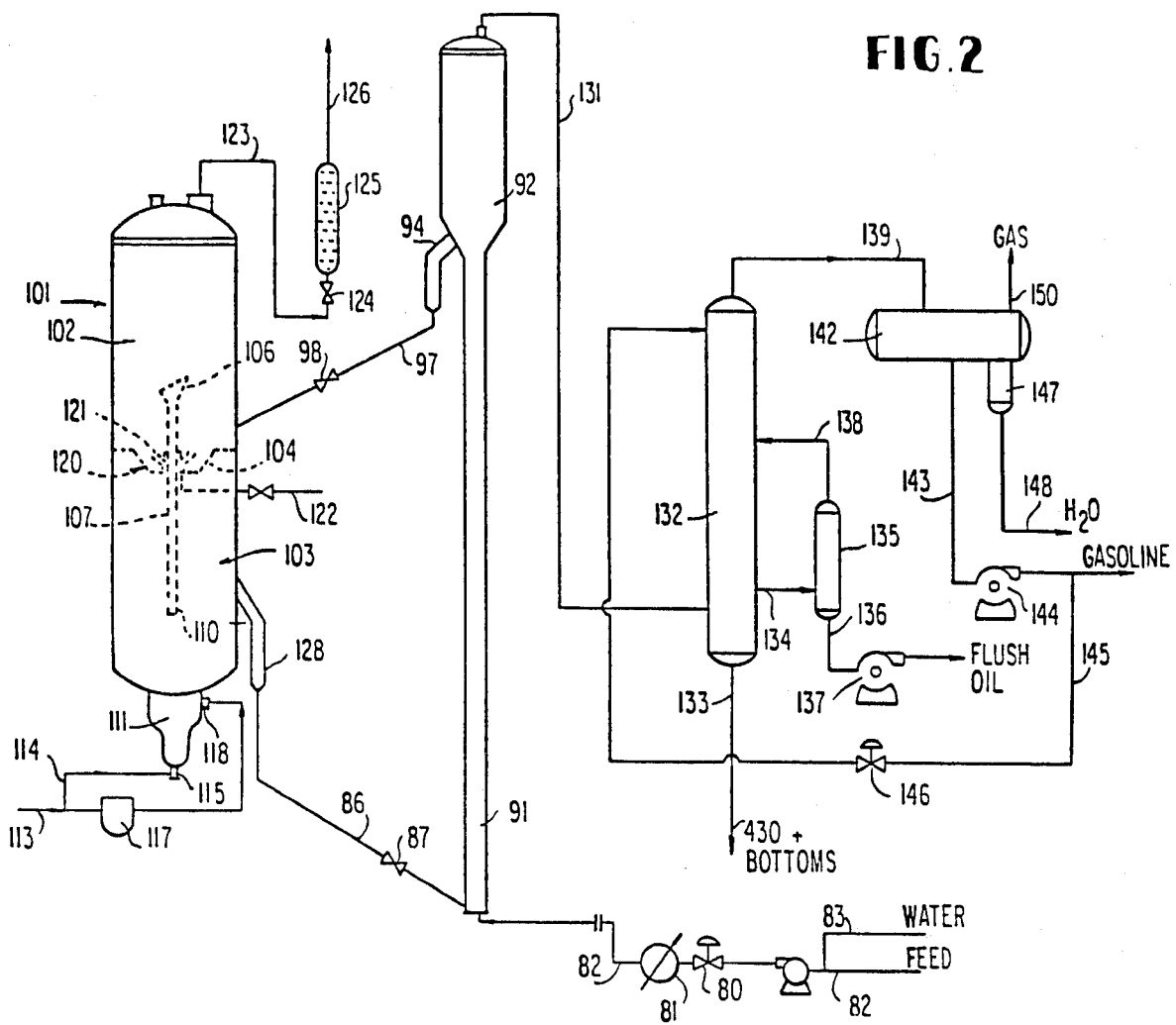
FIG. 2 is a schematic diagram of a second apparatus for carrying out the invention.

In FIG. 2 reference numeral 80 identifies a feed control valve in feedstock supply pipe 82. Supply pipe 83 introduces liquid water into the feed. Heat exchanger 81 in supply pipe 82 acts as a feed preheater, whereby preheated feed material may be delivered to the bottom of riser type reactor 91. Catalyst is delivered to the reactor through catalyst standpipe 86, the flow of catalyst being regulated by a control valve 87 and suitable automatic control equipment (not shown) with which persons skilled in the art of designing and operating riser type crackers are familiar.

The riser 91 may optionally include provision for injection of steam and, if desired, other gaseous and/or vaporizable material for the purpose described above. The reactor is equipped with a disengagement chamber 92 similar to the disengagement chamber 19 of the reactor shown in FIG. 1, and the FIG. 2 embodiment thus includes means for causing product vapors to undergo a change of direction for sudden and effective separation from the catalyst as in the previous embodiment. Catalyst departs disengagement chamber 92 through stripper 94 which operates in a manner similar to stripper 32 of FIG. 1. Spent catalyst passes from stripper 94 to regenerator 101 via spent catalyst transfer pipe 97 having a slide valve 98 for controlling the flow.

Regenerator 101 is divided into upper chamber 102 and lower chamber 103 by a divider panel 104 intermediate the upper and lower ends of the regenerator. The spent catalyst from transfer pipe 97 enters upper chamber 102 in which the catalyst is partially regenerated. A funnel-like collector 106 having a bias-cut upper edge receives partially regenerated catalyst from the upper surface of the dense phase of catalyst in upper chamber 102 and delivers it via drop leg 107 having an outlet 110 beneath the upper surface of the dense phase of catalyst in lower regeneration chamber 103. Instead of the internal catalyst drop leg 107, one may use an external drop leg. Valve means in such external drop leg can control the catalyst residence time and flow rate in and between the upper and lower chambers.

Air is supplied to the regenerator through an air supply pipe 113. A portion of the air travels through a branch supply pipe 114 to bayonet 115 extending upwardly in the interior of plenum 111 along its central axis. Catalyst in chamber 103 has access to the space within plenum 111 between its walls and the bayonet 115. A small bayonet (not shown) in the aforementioned space fluffs the catalyst and urges it upwardly toward a horizontally arranged ring distributor (not shown) where the open top of plenum 111 opens into chamber 103. The remainder of the air passing through air supply pipe 113 may be heated in air heater 117 (at least during start-up with VGO) and is then introduced into the inlet 118 of the aforementioned ring distributor, which may be provided with holes, nozzles or other apertures which produce an upward flow of gas to fluidize the partially regenerated catalyst in chamber 103.

The air introduced in the manner described above completes in chamber 103 the regeneration of the partially regenerated catalyst received via drop leg 107. The amount of air that is supplied is sufficient so that the air and/or the resultant combustion gases are still able to support combustion upon reaching the top of chamber 103. The aforementioned drop leg 107 extends through an enlarged aperture in panel 104, to which is secured a gas distributor 120 which is concentric with and surrounds the drop leg. Via gas distributor 120, combustion supporting gases, which have now been partially depleted of combustion supporting gas, are introduced into the upper regenerator chamber 102 where they contact for purposes of partial oxidation the incoming spent catalyst from spent catalyst transfer pipe 97. Apertured probes 121 or other suitable means in gas distributor 120 assist in achieving a uniform distribution of the partially depleted combustion supporting gas in upper chamber 102. Supplemental air or other fluids may be introduced into upper chamber 102, if desired through supply pipe 122, which discharges into or through gas distributor 120.

Fully regenerated catalyst with less than about 0.25% carbon, preferably less than about 0.1% and more preferably less than about 0.05%, is discharged from lower regenerator chamber 103 through a regenerated catalyst stripper 128, whose outlet feeds into the catalyst standpipe 86 mentioned above. Thus, regenerated catalyst is returned to riser 91 for contact with additional fresh feed from feed supply pipe 82. Whatever heat is introduced into the recycled catalyst in the regenerator 101 is available for heat transfer with the fresh feed in the riser.

The division of the regenerator into upper and lower regeneration chambers 102 and 103 not only smooths out variations in catalyst regenerator residence time but is also uniquely of assistance in restricting the quantity of regeneration heat which is imparted to the fresh feed while yielding a regenerated catalyst with low levels of residual carbon for return to the reactor. Because of the arrangement of the regenerator, the spent catalyst from transfer line 97, with its high loading of carbon, contacts in chamber 102 combustion supporting gases which have already been at least partially depleted of oxygen by the burning of carbon from partially regenerated catalyst in lower regenerator chamber 102. Because of this, it is possible to control both the combustion and the quantity of carbon dioxide produced in upper regenerator chamber 102. Although the air or other regenerating gas introduced through air supply pipe 113 and branch conduit 114 may contain a relatively large quantity of oxygen, the partially regenerated catalyst which they contact in lower regenerator chamber 103 has already had part of its carbon removed. The high concentration of oxygen and the temperature of the partially regenerated catalyst combine to rapidly remove the remaining carbon in the catalyst, thereby achieving a clean regenerated catalyst with a minimum of heat release. Thus, here again, the combustion temperature and the CO:$CO_2$ ratio in the lower regeneration chamber are therefore readily controlled. The regeneration off gases are discharged from upper regenerator chamber 102 via off gas pipe 123, regulator valve 124, catalyst fines trap 125 and outlet 126.

The vapor products from disengagement chamber 92 may be processed in any convenient manner such as for example, by discharge through vapor discharge line 131 to the inlet of fractionator 132. Said fractionator includes a bottoms outlet 133, side outlet 134, flush oil stripper 135, and stripper bottom outlet and discharge line 136 connected to pump 137 for discharging flush oil. The overhead product from stripper 135 is routed via stripper overhead return line 138 to the fractionator 132.

The main overhead discharge line 139 of the fractionator is connected to overhead receiver 142 having a bottom discharge line 143 feeding into pump 144 for discharging gasoline product. If desired, a portion of this product may be sent via recirculation line 145, the flow being controlled by recirculation valve 146, back to the fractionator 132. The overhead receiver also includes a water receiver 147 and a water discharge line 148. The gas outlet 150 of the overhead receiver discharges a stream which is mainly below $C_5$, but containing some $C_5$, $C_6$ and $C_7$ material. If desired, the $C_5$ and above material in this gas stream may be separated by compression, cooling and fractionation and recycled to the overhead receiver with a compressor, cooler and fractionator (not shown).

EXAMPLES

The following examples are given only by way of illustration and not for limiting the invention. The properties of the feedstocks employed in the examples and useful catalysts are set forth in tables I and II above.

EXAMPLES 1-3

A unit constructed in accordance with FIG. 1 was operated in the manner and with the results set forth in Table III and in accordance with the teachings of FIG. 1 and the associated description thereof.

EXAMPLES 4-6

These examples were conducted as indicated in Table III with a unit constructed in accordance with the teachings of FIG. 2. Regeneration was carried out in two stages.

TABLE III

| | EXAMPLES | | | | | |
|---|---|---|---|---|---|---|
| | 1 | 2 | 3 | 4 | 5 | 6 |
| Feedstock | | | | Murb.-Mex.[2] | ABL.R.C[3] | ABL.R.C[3] |
| Feed #/hr.[1] | 75,215 | 74,478 | 72,209 | 2741.72 | 2556 | 2268 |
| Steam #/hr. | 4,050 | 3,840 | 3,910 | 249.2 | 188.4 | 193.0 |
| Water #/hr. | 8,210 | 9,230 | 9,380 | N/A | N/A | 96.4 |
| Catalyst | GRZ-1 | GRZ-1 | GRZ-1 | | | |
| Cat/Oil Ratio | 6.0 | 5.14 | 5.8 | 8.1 | 6.2 | 9.6 |
| Riser Vapor | | | | | | |
| Residence Time Seconds | | | | 1.5 | 1.6 | 2.6 |
| Rx Temperature F. | 1010 | 1012 | 1010 | 1025 | 1002 | 980 |
| Pressure (psia) | 35 | 36.3 | 34.6 | 34.1 | 33.6 | 35.1 |
| Products | | | | | | |
| Dry Gas Wt. % | 6.1 | 4.9 | 5.6 | 5.5 | 5.5 | 4.8 |
| $C_3$ Sat. Vol. % | 3.5 | 3.2 | 2.2 | 2.7 | 3.4 | 2.7 |
| $C_3$ Olefins Vol. % | 8.9 | 5.4 | 5.9 | 9.6 | 11.1 | 9.2 |
| $C_4$ Sat. Vol. % | 3.9 | 6.8 | 3.5 | 5.9 | 7.7 | 7.0 |
| $C_4$ Olefins Vol. % | 7.1 | 7.3 | 8.3 | 10.5 | 11.4 | 9.7 |
| $C_5$-430° Vol. % | 46.1 | 33.4 | 45.2 | 52.2 | 48.0 | 51.7 |
| Coke Wt. % | 10.0 | 8.9 | 10.0 | 8.4 | 10.5 | 11.6 |
| Material Balance Wt. % | 105.8 | 97.4 | 102.7 | 99.0 | 98.2 | 95.1 |
| Selectivity | .72 | .58 | .70 | .68 | .63 | .63 |
| Conversion, Vol. % | 63.6 | 59.8 | 64.3 | 76.7 | 76.6 | 82.1 |
| Volume Yield liq. vol. % | 123.6 | 111.3 | 118.1 | 118.8 | 118.1 | 111.0 |
| Gasoline | | | | | | |
| API Gravity | 54.2 | 53.0 | 52.7 | 47.7 | 60.5 | 47.8 |
| Distillation | | | | | | |
| IBP | 94 | 94 | 104 | 152 | 95 | 168 |
| 50% | 238 | 254 | 255 | 258 | 212 | 264 |
| 95% | 434 | 438 | 435 | 398 | 398 | 420 |
| RONC | 91.6 | 89.4 | 89.2 | 93.8 | 93.6 | 92.3 |
| MONC | 80.6 | 78.7 | 78.9 | 80.8 | 82.2 | 82.7 |
| Regeneration Temp. | 1350 | 1336 | 1330 | N/A | N/A | N/A |
| Upper Regen. Temp. F. | N/A | N/A | N/A | 1249 | 1407 | 1303 |
| Lower Regen Temp. F. | N/A | N/A 1 | N/A | 1355 | 1422 | 1325 |
| Spent Catalyst Wt. % C. | 1.67 | 1.72 | 1.72 | 1.14 | 1.63 | 1.17 |
| Regenerated Catalyst % C. | .43 | .53 | .53 | .01 | .01 | .01 |
| Circulating Catalyst % C. | | | | .49 | .42 | .34 |
| $O_2$ Effluent (mol % of total flue gas) | 0 | 0 | 0 | 0 | 0 | 0 |
| $CO_2/CO$ lb./lb. | 2.67 | 2.43 | 3.19 | 5.8 | 4.7 | 3.81 |

[1]Fresh feed only, except that Example 3 includes recycle of 9,477 #/hr. of HCO (heavy cycle oil), having an API gravity of 18.3 and boiling at about 550 to 775, injected into the reduced crude line to the riser.
[2]Equilibrium Davison Super DX
[3]Arabian Light Reduced Crude

EXAMPLE 7

A riser catalytic cracking unit of the type described hereinabove is operated with a hydrocarbon feedstock containing about 1,940 barrels per day of gas oil, 3,730 barrels per day of reduced crude and 860 barrels per day of HSR naphtha and with about 6,960 pounds per hour of recycled water having 150 ppm $H_2S$. The recycled water is added at the bottom portion of the reaction zone to the hydrocarbon feed. Steam is also introduced at a rate of 1,100 pounds per hour. The reaction temperature in the riser is about 540° C. The catalyst employed contains about 4,000 ppm nickel and about 2,500 ppm of vanadium. The catalyst employed is a zeolite molecular sieve available under trade designation F87 from Filtrol Corporation. The product obtained is as follows:

Conversion LV%—67.5
$H_2/C_1$ Ratio—0.774
$C_2$ and lighter, weight percent—7.2
Total $C_3$, Volume percent—12.7
Total $C_4$, Volume percent—11.7
Total 220° C. (430° F.)EP Gasoline, Volume percent—45.8
220°-335° C. (430°-635° F.) LCO, Volume percent—17.7
335° C. (635° F.) 1BP slurry oil, Volume percent—14.8
Coke, Weight percent—7.9

EXAMPLE 8

A comparison run is made similar to that in Example 7 wherein the hydrocarbon feed is about 1,760 barrels per day of gas oil, about 3,670 barrels per day of reduced crude oil, and 840 barrels per day of HSR naphtha. The main difference between this test and that in Example 7 is that the recycled water having 90 ppm $H_2S$ is reduced to less than 100 pounds/hour. The temperature of the reactor is about 540° C. The catalyst contains about 5,000 ppm nickel and about 3,000 ppm vanadium. The product obtained is as follows:

Conversion, LV%—64.1
$H_2/C_1$ Ratio—0.775
$C_2$ and Lighter, Weight percent—8.2
Total $C_3$, Volume percent—9.7
Total $C_4$, Volume percent—10.0

Total 220° C. (430° F.) EP Gaso, Volume Percent—40.2

It is noted that the amount of coke produced in this run, 8.7 weight percent, is much greater than that produced in the tests as discussed in Example 7. Accordingly, it is quite apparent that the addition of the water significantly affects the coke formation. Light gas ($C_2$ and lighter) production increased, and $C_3$-$C_4$ production decreased. The result is that water in the riser increased the amount of gasoline produced.

The following table (Table IV) summarizes some tests which were carried out to determine the interrelationship of the addition of recycled water on conversion with respect to increased amounts of metal on the catalyst. As evident from these results, deleterious effects of increased quantities of metal were minimized. The reactor temperature was 540° C. to 545° C.

TABLE IV

|  | 9 | 10 | 11 | 12 | 13 | 14 |
|---|---|---|---|---|---|---|
| Gas Oil Charge, BPD | 2180 | 2210 | 2090 | 2060 | 1900 | 1760 |
| Reduced Crude Charge, BPD | 3760 | 3720 | 3700 | 3620 | 3650 | 3670 |
| NSR Naphtha, BPD | 0 | 0 | 0 | 0 | 790 | 840 |
| ppm $H_2S$ in recycle water | 140 | 165 | 120 | 110 | 100 | 90 |
| Total liquid recycle $H_2O$ to Riser Kg/Hr | 3311 | 3266 | 2268 | 2540 | 2994 | 45.3 |
| Total steam, Kg/Hr | 1700 | 1300 | 1110 | 1050 | 860 | — |
| Total $H_2O$ to Riser Kg/Hr | 5011 | 4566 | 3378 | 3590 | 3674 | 45.3 |
| Conversion, LV % | 73.0 | 76.2 | 72.2 | 64.4 | 65.0 | 64.1 |
| Ni on Catalyst ppm | 2700 | 3900 | 4900 | 4200 | 4900 | 5000 |
| V on Catalyst ppm | 1700 | 2100 | 1800 | 2300 | 2800 | 3000 |
| $H_2/C_1$ Ratio | .647 | .697 | .667 | .654 | .724 | .775 |
| Mat'l Balance Error, Wt. % | −4.2 | −9.3 | −2.1 | −2.0 | −4.8 | +1.0 |
| C and Lighter Wt. % | 6.1 | 6.5 | 6.2 | 6.9 | 8.2 | 8.2 |
| Total $C_3$, Vol % | 7.8 | 9.6 | 10.0 | 9.7 | 7.9 | 9.7 |
| Total $C_4$, Vol % | 15.1 | 13.0 | 10.5 | 9.5 | 8.4 | 10.0 |
| Total $C_5$-220° C. EP Gaso, Vol % | 46.5 | 43.7 | 49.4 | 39.8 | 37.4 | 40.2 |
| 220-335° C. LCO Vol % | 12.3 | 11.4 | 11.4 | 14.7 | 15.5 | 16.4 |
| 335° C. IBP Slurry Vol % | 7.4 | 7.7 | 7.5 | 7.8 | 8.1 | 8.7 |
| % $H_2O$ based on Residual Oil | 7.8 | 7.7 | 5.3 | 5.8 | 6.9 | 0.1 |

The following table (Table V) represents the results from some experiments which illustrate the advantage of employing at least some recycled water of this invention rather than all fresh water in order to decrease the production of hydrogen. The presence of the $H_2S$ is essential for this purpose. It is further noted that these examples illustrate that increased amounts of metal on the catalyst do not significantly affect the percent conversion of the feedstock.

TABLE V

|  | Conversion % | Metals on Cat-PPM | | | Ratio $H_2/C_1$ |
|---|---|---|---|---|---|
|  |  | Ni | V | Fe |  |
| Run 15 | 67.3 | 1680 | 1570 | 3600 | 1.87 |
| Run 16 | 64.0 | 1930 | 2330 | 4200 | 1.64 |
| Run 17 | 63.3 | 2420 | 2900 | 4300 | 1.52 |
| Run 18 | 63.3 | 2400 | 2900 | 4300 | 1.71 |

All runs at 520° C. with 10% liquid water based on residual oil.
Run 15 - Reduced crude with fresh water - no sulfur compound.
Run 16 - Reduced crude with Column overhead (recycle) water containing 2,000-4,000 ppm $H_2S$ + 3,200 ppm $NH_3$.
Run 17 - Reduced crude with Column overhead (recycle) water containing 2,000-4,000 ppm $H_2S$. This run includes the addition of dimethyl sulfide (approximately 453.59 Kg/day) injected into the steam used in the regenerated catalyst stripper.
Run 18 - Identical to Run 17 except no dimethyl sulfide was added.

What is claimed is:

1. A process for economically converting carbometallic oils to lighter products, comprising:
   I. providing a converter feed that has had substantially no prior hydrotreatment and contains at least about 70% by volume of 650° F.+ material and at least about 10% by volume of material which will not boil below about 1,025° F., said converter feed being characterized by a carbon residue on pyrolysis of at least about 2 and by containing at least about 5.5 ppm of Nickel Equivalents of heavy metal(s);
   II. bringing said converter feed together with additional material comprising liquid water, said liquid water being in a weight ratio relative to converter feed in the range of about 0.04 to about 0.15 and containing at least about 100 ppm by weight of hydrogen sulfide, less than 100 ppm sodium and less than 500 ppm each of calcium and magnesium, and at least a portion of said liquid water being recycle water condensed from a product stream of a previously converted hydrocarbon feed;
   III. bringing said converter feed together with hot cracking catalyst at a catalyst to fresh converter feed weight ratio of at least about 6, said catalyst having an equilibrium microactivity test conversion level of at least about 60 volume percent and bearing an accumulation of at least about 3,000 ppm by weight of Nickel Equivalents of heavy metal(s) expressed as metal(s) on regenerated equilibrium catalyst;

IV. forming a stream containing fine droplets of said converter feed, said catalyst and steam resulting from the vaporization of said liquid water and causing the resultant stream to flow through a progressive flow type reactor having an elongated riser reaction chamber which is at least in part vertical or inclined at a linear velocity of at least about 35 feet per second for a vapor residence time in the range of about 0.5 to about 3 seconds at a reaction chamber outlet temperature of about 900° to about 1,200° F. and under a pressure of about 15 to about 35 pounds per square inch absolute sufficient for causing a conversion per pass in the range of about 60% to about 90% while producing coke in amounts of at least about 6% by weight based on fresh feed, and laying down coke on the catalyst in amounts in the range of about 0.3 to about 3% by weight, but insufficient for fully vaporizing the converter feed;

V. separating said catalyst from at least a substantial portion of the stream comprising said catalyst, steam and resultant cracking products formed in the elongated reaction chamber;

VI. stripping said separated catalyst;

VII. regenerating said catalyst with oxygen-containing combustion-supporting gas under conditions of time, temperature and atmosphere sufficient to reduce the carbon on the catalyst to about 0.25% by weight or less, while forming combustion product gases which comprise CO and/or $CO_2$, and maintaining the $CO:CO_2$ molar ratio of those combustion product gases formed from the burning of at least the major portion of the coke at a level of at least about 0.25 while such gases are in heat exchange contact with the catalyst; and VIII. recycling the regenerated catalyst to the reactor for contact with fresh feed.

2. A process for economically converting carbo-metallic oils to lighter products, comprising:

I. providing a converter feed which contains at least about 70% by volume of 650° F.+ material characterized by a carbon residue on pyrolysis of at least about 2 and by containing at least about 5.5 ppm by weight of Nickel Equivalents of heavy metal(s);

II. bringing said converter feed together with cracking catalyst having an equilibrium microactivity test conversion activity level of at least about 60 volume percent and bearing an accumulation of at least about 3,000 ppm by weight of Nickel Equivalents of heavy metal(s), expressed as metal(s) on regenerated equilibrium catalyst, and with additional material in a weight ratio relative to feed of up to about 0.4 including $H_2O$ in a weight ratio relative to feed of at least about 0.04 to form a stream comprising a suspension of said catalyst in said feed and said additional material wherein the catalyst to feed weight ratio is at least about 6 and the ratio of the partial pressure of the additional material relative to the partial pressure of the feed is in the range of about 0.8 to about 4, and causing the resultant stream to flow at a linear velocity of at least about 35 feet per second through a progressive flow type reactor having an elongated reaction chamber which is at least in part vertical or inclined for a vapor residence time in the range of about 0.5 to about 2.5 seconds at a reaction chamber outlet temperature of about 900 to about 1,300° F. and under a total pressure of about 15 to about 35 pounds per square inch absolute sufficient for causing a conversion per pass in the range of about 60% to about 90%, while producing at least about 6% coke by weight based on fresh feed and laying down coke on the catalyst in amounts in the range of about 0.3 to about 3% by weight;

III. abruptly separating catalyst from product vapors at the downstream end of said elongated reaction chamber, discharging the catalyst thus separated into a catalyst collection chamber, and preventing at least about 80% by volume of the total feed and product vapors which have passed through said elongated reaction chamber from having further contact with the thus separated catalyst in said catalyst collection chamber;

IV. stripping said separated catalyst;

V. regenerating said catalyst with oxygen-containing combustion-supporting gas under conditions of time, temperature and atmosphere sufficient to reduce the carbon on the catalyst to about 0.25% by weight or less, while forming combustion product gases which comprise CO and/or $CO_2$, and maintaining the $CO:CO_2$ molar ratio of those combustion product gases formed from the burning of at least the major portion of the coke at a level of at least about 0.25 while such gases are in heat exchange contact with the catalyst; and VI. recycling the regenerated catalyst to the reactor at a temperature of at least about 1,275° F. for contact with fresh feed.

3. A process for economically converting carbo-metallic oils to lighter products, comprising:

I. providing a converter feed containing 650° F.+ material, said 650° F.+ material being characterized by a carbon residue on pyrolysis of at least about 1 and by containing at least about 5.5 ppm by weight of Nickel Equivalents of heavy metal(s);

II. bringing said converter feed together with cracking catalyst having an equilibrium microactivity test conversion activity level of at least about 40 volume percent and bearing an accumulation of at least about 3,000 ppm by weight of Nickel Equivalents of heavy metal(s), expressed as metal(s) on regenerated equilibrium catalyst, and with additional material in a weight ratio to feed of up to about 0.4 including $H_2O$ in a weight ratio to feed of at least about 0.04 to form a stream comprising a suspension of said catalyst in said feed and additional material wherein the ratio of the partial pressure of the additional material relative to the partial pressure of the feed is in the range of about 0.25 to about 4, and causing the resultant stream to flow at a linear velocity of at least about 25 feet per second through a progressive flow type reactor having an elongated reaction chamber which is at least in part vertical or inclined for a vapor residence time in the range of about 0.5 to about 6 seconds at a reaction chamber outlet temperature of about 900° to about 1,400° F. and under a total pressure of about 10 to about 50 pounds per square inch absolute sufficient for causing a conversion per pass in the range of about 60% to about 90%, while producing at least about 6% coke by weight based on fresh feed and laying down coke on the catalyst in amounts of at least about 0.3% by weight based on catalyst;

III. separating catalyst from product vapors at the downstream end of said elongated reaction chamber;

IV. stripping said separated catalyst;

V. regenerating said catalyst with oxygen-containing combustion-supporting gas under conditions of time, temperature and atmosphere sufficient to reduce the carbon on the catalyst to about 0.25% by weight or less, while forming combustion product gases which comprise CO and/or $CO_2$, and maintaining the $CO:CO_2$ molar ratio of those combustion product gases formed from the burning of at least the major portion of the coke at a level of at least about 0.25 while such gases are in heat exchange contact with the catalyst; and VI. recycling the regenerated catalyst to the reactor for contact with fresh feed.

4. The process according to claim 3 in which at least a portion of said $H_2O$ is liquid water when brought together with said converter feed.

5. A process according to claim 3 in which substantially all of said $H_2O$ is liquid water when brought together with said converter feed.

6. A process according to claim 3 in which at least a portion of said $H_2O$ is steam when brought together with said converter feed.

7. A process according to claim 3 in which a portion of said $H_2O$ is steam and another portion of said $H_2O$ is liquid water when brought together with said converter feed.

8. A process according to any of claims 2, 3, 4, 5, 6 or 7 in which the weight ratio of total $H_2O$ relative to feed is in the range of about 0.04 to about 0.4.

9. A process according to any of claims 2, 3, 4, 5, 6 or 7 in which the weight ratio of total $H_2O$ to feed is about 0.3 or less.

10. A process according to any of claims 6 or 7 in which the weight ratio of steam to feed is in the range of about 0.01 to about 0.25.

11. A process according to any of claims 4, 5 or 7 in which the weight ratio of liquid water to feed is in the range of about 0.04 to about 0.15.

12. A process according to any of claims 4, 5 or 7 in which the weight ratio of liquid water to feed is in the range of about 0.04 to about 0.1.

13. A process according to any of claims 4, 5 or 7 in which the weight ratio of liquid water to feed is in the range of about 0.05 to about 0.1.

14. A process according to claim 4 in which the total amount of liquid water added to the feed is in the range of about 1% to about 25% by weight of said 650° F.+ material.

15. A process according to claim 4 in which the total amount of liquid water added to converter feed is in the range of about 5% to about 15% by weight of said 650° F.+ material.

16. A process according to claim 4 in which the liquid water and converter feed are mixed in an atomizing nozzle and sprayed into contact with the catalyst.

17. A process according to claim 4 in which the liquid water is brought together with the converter feed prior to bringing said converter feed into contact with the cracking catalyst.

18. A process according to claim 4 in which the liquid water is brought together with the converter feed substantially simultaneously with or subsequent to bringing said converter feed into contact with the cracking catalyst.

19. A process according to claim 10 in which the weight ratio of total $H_2O$ to feed is about 0.3 or less.

20. A process according to claim 7 in which the weight ratio of liquid water relative to steam is in the range of about 0.2 to about 5.

21. A process according to claim 2 wherein said $H_2O$ is brought into contact with said converter feed in the form of liquid water in a weight ratio relative to converter feed in the range of 0.04 to about 0.15 and in the form of steam in a weight ratio relative to converter feed in the range of about 0.01 to about 0.25, the total $H_2O$ thus supplied not exceeding a weight ratio of about 0.3 relative to converter feed.

22. A process according to either of claims 2 or 3 in which at least a portion of said water is recycle water from a product stream of a previously converted hydrocarbon feed.

23. A process according to either of claims 2 or 3 in which substantially all of said water is recycle water from a product stream of a previously converted hydrocarbon feed.

24. A process according to either of claims 2 or 3 in which said water contains at least 120 ppm by weight of hydrogen sulfide, and in which said conversion per pass comprises a yield of $C_5$-430° F. gasoline representing at least about 44% by volume of the total amount of fresh feed.

25. A process according to either of claims 2 or 3 in which said water contains more than 1,000 ppm hydrogen sulfide.

26. A process according to either claims 2 or 3 wherein the total amount of water added to the feed is in the range of about 1% to about 25% by weight of said 650° F.+ portion of the feed and said water contains more than 1,000 ppm hydrogen sulfide.

27. A process for economically converting carbometallic oils to lighter products, comprising:

I. providing a converter feed containing 650° F.+ material, said 650° F.+ material being characterized by a carbon residue on pyrolysis of at least about 1 and by containing at least about 5 parts per million combined of nickel and vanadium;

II. bringing said converter feed together with cracking catalyst having an equilibrium microactivity test conversion activity level of at least about 40 and bearing an accumulation of at least about 1,000 ppm combined of nickel and vanadium expressed as weight of metal(s) on regenerated equilibrium catalyst;

III. bringing said converter feed together with additional material comprising water, said water being in a weight ratio relative to feed in the range of about 0.04 to about 0.3 and containing at least 100 ppm hydrogen sulfide, less than 100 ppm sodium and less than 500 ppm each of calcium and magnesium;

IV. forming a stream containing a mixture of said converter feed, said catalyst and said water and causing the resultant stream to flow through a progressive flow type reactor having an elongated reaction chamber which is at least in part vertical or inclined for a vapor residence time in the range of about 0.5 to about 10 seconds at a reaction chamber outlet temperature of about 900° to about 1,400° F. and under a pressure of about 10 to about 50 pounds per square inch absolute sufficient for causing a conversion per pass in the range of about 60% to about 90% while producing coke in amounts of at least about 6% by weight based on fresh feed, and laying down coke on the catalyst in amounts of at least about 0.3% by weight based on catalyst;

V. separating said catalyst from the resultant cracking products;

VI. stripping said separated catalyst;

VII. regenerating said catalyst with oxygen-containing combustion-supporting gas under conditions of time, temperature and atmosphere sufficient to reduce the carbon on the catalyst to about 0.25% by weight or less, while forming combustion product gases which comprise CO and/or $CO_2$, and maintaining the $CO:CO_2$ molar ratio of those combustion product gases formed from the burning of at least the major portion of the coke at a level of at least about 0.25 while such gases are in heat exchange contact with the catalyst; and VIII. recycling the regenerated catalyst to the reactor for contact with fresh feed.

28. A process according to claim 27 in which said 650° F.+ material contains at least about 5.5 ppm of Nickel Equivalents of heavy metal(s) expressed as weight of metal(s) on regenerated equilibrium catalyst.

29. A process for economically converting carbometallic oils to lighter products, comprising:
  I. providing a converter feed containing 650° F.+ material, said converter feed being characterized by a carbon residue on pyrolysis of at least about 1 and by containing at least about 5.5 ppm of Nickel Equivalents of heavy metals(s);
  II. bringing said converter feed together with additional material comprising water, said water being in a weight ratio relative to converter feed in the range of about 0.04 to about 0.3 and containing at least 100 ppm by weight of hydrogen sulfide, less than 100 ppm sodium and less than 500 ppm each of calcium and magnesium;
  III. bringing said converter feed together with cracking catalyst having an equilibrium microactivity test conversion activity level of at least about 60 volume percent and bearing an accumulation of at least about 3,000 ppm by weight of Nickel Equivalents of heavy metal(s) expressed as metal(s) on regenerated equilibrium catalyst;
  IV. forming a stream containing a mixture of said converter feed, said catalyst and said water and causing the resultant stream to flow through a progressive flow type reactor having an elongated reaction chamber which is at least in part vertical or inclined at a linear velocity of at least about 35 feet per second for a vapor residence time in the range of about 0.5 to about 6 seconds at a reaction chamber outlet temperature of about 900° to about 1,300° F. and under a pressure of about 15 to about 35 pounds per square inch absolute sufficient for causing a conversion per pass in the range of about 60% to about 90% while producing coke in amounts of at least about 6% by weight based on fresh feed, and laying down coke on the catalyst in amounts of at least about 0.3% by weight based on catalyst;
  V. separating said catalyst from at least a substantial portion of the stream comprising said catalyst and steam and resultant cracking products formed in the elongated reaction chamber;
  VI. stripping said separated catalyst;
  VII. regenerating said catalyst with oxygen-containing combustion-supporting gas under conditions of time, temperature and atmosphere sufficient to reduce the carbon on the catalyst to about 0.25% by weight or less, while forming combustion product gases which comprise CO and/or $CO_2$, and maintaining the $CO:CO_2$ molar ratio of those combustion product gases formed from the burning of at least the major portion of the coke at a level of at least about 0.25 while such gases are in heat exchange contact with the catalyst; and
  VIII. recycling the regenerated catalyst to the reactor for contact with fresh feed.

30. A process according to claim 29 in which at least a portion of said water is recycle water from a product stream of a previously converted hydrocarbon feed.

31. A process according to claim 29 wherein substantially all of said water brought together with the feed is recycle water condensed from the product stream of a previously converted oil feed.

32. A process according to claim 29 wherein said weight ratio of water to converter feed is in the range of about 0.04 to about 0.1.

33. A process according to claim 29 wherein water is brought into contact with said converter feed prior to, substantially simultaneously with, and/or subsequent to formation of said stream in the form of steam in a weight ratio relative to feed in the range of about 0.01 to about 0.25 and in the form of liquid water, the total water thus supplied not exceeding a weight ratio of about 0.3 relative to converter feed.

34. A process according to claim 2 wherein said accumulation of heavy metal(s) on said catalyst is at least about 4,000 ppm by weight of Nickel Equivalents expressed as metal(s) on regenerated equilibrium catalyst.

35. A process according to claim 2 wherein said accumulation of heavy metal(s) on said catalyst is at least about 5,000 ppm by weight of Nickel Equivalents expressed as metal(s) on regenerated equilibrium catalyst.

36. A process according to claim 3 wherein said carbon residue corresponds with a Ramsbottom carbon value of at least about 1.

37. A process according to claim 3 wherein said converter feed as a whole is characterized by a carbon residue on pyrolysis of at least about 1.4.

38. A process according to claim 2 wherein the total amount of water added to the feed is in the range of about 5% to about 15% by weight of said 650° F.+ material, and said water contains more than 1,000 ppm hydrogen sulfide.

39. A process according to claim 4 wherein said liquid water contains less than 25 ppm sodium.

40. A process according to claim 2 wherein the conversion catalyst is a cracking catalyst containing zeolite.

41. A process according to claim 2 wherein the feed as a whole contains at least about 2 ppm by weight of nickel.

42. A process according to claim 2 wherein said 650° F.+ material has a carbon residue on pyrolysis of at least about 4.

43. A process according to claim 2 wherein said carbon residue corresponds with a Ramsbottom carbon value in the range of about 2 to about 12.

44. A process according to claim 2 wherein said carbon residue corresponds with a Ramsbottom carbon value in the range of about 4 to about 8.

45. A process according to claim 3 in which said converter feed as a whole is characterized by carbon residue on pyrolysis of at least about 2.

46. A process according to claim 2 in which said converter feed as a whole is characterized by carbon residue on pyrolysis of at least about 4.

47. A process according to claim 3 wherein the carbon residue of the feed as a whole corresponds with a Ramsbottom carbon value of at least about 1.

48. A process according to claim 2 wherein the carbon residue of the feed as a whole corresponds with a Ramsbottom carbon value in the range of about 2 to about 12.

49. A process according to claim 2 in which the Ramsbottom carbon value of the feed as a whole is in the range of about 4 to about 8.

50. A process according to claim 2 wherein the carbon residue of the converter feed as a whole corresponds with a Ramsbottom carbon value not exceeding about 12.

51. A process according to claim 2 in which said converter feed is at a temperature of about 500° F. or less when it is brought together with said cracking catalyst.

52. A process according to claim 2 in which said converter feed comprises at least about 85% by volume of said 650° F.+ material.

53. A process according to claim 2 in which said converter feed comprises substantially 100% by volume of said 650° F.+ material.

54. A process according to claim 2 in which the 650° F.+ material includes at least about 10% by volume of material which will not boil below about 1,000° F.

55. A process according to claim 2 in which the 650° F.+ material includes at least about 15% by volume of material which will not boil below about 1,000° F.

56. A process according to claim 2 in which the 650° F.+ material includes at least about 20% by volume of material which will not boil below about 1,000° F.

57. A process according to claim 2 in which the 650° F.+ material includes at least about 10% by volume of material which will not boil below about 1,025° F.

58. A process according to claim 2 in which the 650° F.+ material includes at least about 15% by volume of material which will not boil below about 1,025° F.

59. A process according to claim 2 in which the 650° F.+ material includes at least about 20% by volume of material which will not boil below about 1,025° F.

60. A process according to claim 2 wherein at least about 85% by volume of the feed is oil which has not previously been contacted with cracking catalyst under cracking conditions.

61. A process according to claim 2 wherein at least about 90% by volume of the converter feed is oil which has not previously been contacted with cracking catalyst under cracking conditions.

62. A process according to claim 2 wherein said feed is processed in a substantially once-through or single pass mode with no substantial amount of recycled oil in the feed.

63. A process according to claim 2 wherein said feed comprises about 15% or less by volume of recycled oil.

64. A process according to claim 2 wherein said converter feed comprises about 10% or less by volume of recycled oil.

65. A process according to claim 2 wherein said converter feed comprises at least about 0.8% by weight of sulfur.

66. A process according to claim 2 wherein said converter feed comprises at least about 10% by volume of material which will not boil below about 1,000° F., and has an average composition characterized by:
 (a) an atomic hydrogen to carbon ratio in the range of about 1.2 to about 1.9; and
 (b) by containing one or more of the following:
  (i) at least about 0.3% by weight of sulfur;
  (ii) at least about 0.5% by weight of nitrogen; and
  (iii) at least about 0.05% of pentane insolubles.

67. A process according to claim 66 wherein said sulfur is at least about 0.8% by weight.

68. A process according to claim 2 in which said converter feed has had substantially no hydrotreatment.

69. A process according to claim 3 in which the equilibrium microactivity test conversion level of said catalyst is at least about 60 volume percent.

70. A process according to claim 3 wherein said catalyst as introduced into the process has a microactivity of at least about 60 volume percent.

71. A process according to claim 2 wherein there is an accumulation of heavy metal(s) on said catalyst in the range of about 3,000 ppm to about 70,000 ppm by weight of Nickel Equivalents expressed as metal(s) on regenerated equilibrium catalyst.

72. A process according to claim 2 wherein there is an accumulation of heavy metal(s) on said catalyst of at least about 5,000 ppm by weight of Nickel Equivalents expressed as metal(s) on regenerated equilibrium catalyst.

73. A process according to claim 2 wherein there is an accumulation of heavy metal(s) on said catalyst in the range of about 5,000 ppm to about 30,000 ppm by weight of Nickel Equivalents expressed as metal(s) on regenerated equilibrium catalyst.

74. A process according to claim 2 wherein catalyst is added to the process at a rate in the range of about 0.1 to about 5 pounds of catalyst per barrel of feed.

75. A process according to claim 2 wherein replacement catalyst is added to the process at a rate in the range of about 0.1 to about 3 pounds per barrel of feed.

76. A process according to claim 2 wherein replacement catalyst is added to the process at a rate in the range of about 0.15 to about 2 pounds per barrel of feed.

77. A process according to claim 2 wherein replacement catalyst is added to the process at a rate in the range of about 0.2 to about 1.5 pounds per barrel of feed.

78. A process according to claim 2 wherein said catalyst is characterized by a pore structure for absorbing hydrocarbon molecules and by reactive sites within or adjacent the pores.

79. A process according to claim 2 wherein said catalyst is a molecular sieve catalyst.

80. A process according to claim 79 wherein said catalyst is a zeolite containing catalyst.

81. A process according to claim 80 wherein said zeolite containing catalyst includes at least about 5% by weight of sieve.

82. The process of claim 79 in which said catalyst is a fluid cracking catalyst suitable for production of gasoline from vacuum gas oil.

83. A process according to claim 2 wherein said catalyst is equilibrium cracking catalyst which has previously been used in a fluid catalytic cracking unit in which said catalyst was used for the cracking of feed characterized by a carbon residue on pyrolysis of less than 1 and by containing less than about 4 ppm by weight of Nickel Equivalents expressed as heavy metal(s).

84. A process according to claim 2 wherein said catalyst has a particle size in the range of about 5 to about 150 microns.

85. A process according to claim 29 wherein the total amount of additional material other than converter feed and resultant products which is present in said reaction zone is in a weight ratio of up to about 0.4 relative to converter feed.

86. A process according to claim 29 wherein the total amount of additional material other than converter feed and resultant products which is present in said reaction zone is in a weight ratio in the range of about 0.04 to about 0.4 relative to converter feed.

87. A process according to claim 29 wherein the total amount of additional material other than converter feed and resultant products which is present in said reaction zone is in a weight ratio in the range of about 0.04 to about 0.3 relative to converter feed.

88. A process according to claim 2 wherein the total amount of additional material other than converter feed and resultant products which is present in said reaction zone is in a weight ratio in the range of about 0.05 to about 0.25 relative to converter feed.

89. A process according to claim 2 wherein said additional material includes at least one of the following: nitrogen, other inert gases, recycled gas, and hydrogen donors.

90. A process according to claim 3 in which the ratio of the partial pressure of said additional material, including $H_2O$, relative to the partial pressure of the feed in said resultant stream is in the range of about 0.4 to about 2.3.

91. A process according to claim 3 in which the ratio of the partial pressure of said additional material, including $H_2O$, relative to the partial pressure of the feed in said resultant stream is in the range of about 0.25 to about 4.0.

92. A process according to claim 3 wherein the partial pressure of said additional material relative to that of the feed is in the range of about 0.7 to about 1.7.

93. A process according to claim 3 in which said reaction chamber outlet temperature is in the range of about 900° to about 1,300° F.

94. A process according to claim 2 in which said reaction chamber outlet temperature is in the range of about 985° to about 1,200° F.

95. A process according to claim 3 in which said resultant stream flows through said reactor under a pressure of about 15 to about 35 pounds per square inch absolute.

96. A process according to claim 2 wherein the feed partial or total pressure is in the range of about 3 to about 30 psia.

97. A process according to claim 2 wherein the feed partial or total pressure is in the range of about 7 to about 25 psia.

98. A process according to claim 2 wherein the feed partial or total pressure is in the range of about 10 to about 17 psia.

99. A process according to claim 2 wherein said conversion per pass is at least about 70%.

100. A process according to claim 2 wherein said conversion per pass is in the range of about 70% to about 85%.

101. A process according to claim 2 in which said coke is produced in amounts in the range of about 6 to about 14% by weight based on fresh feed.

102. A process according to claim 3 wherein the coke laydown on the catalyst is in the range of about 0.5% to about 3%.

103. A process according to claim 2 wherein the coke laydown on the catalyst is in the range of about 1% to about 2%.

104. A process according to claim 3 in which the residence time of the feed and product vapors is in the range of about 0.5 to about 3 seconds.

105. A process according to claim 2 in which said vapor residence time is less than about 2 seconds.

106. A process according to claim 3 wherein said residence time of the converter feed and product vapors is in the range of about 1.0 to about 3.0 seconds.

107. A process according to claim 2 wherein said residence time of the converter feed and product vapors is in the range of about 1.0 to about 2.5 seconds.

108. A process according to claim 2 wherein said residence time of the converter feed and product vapors is in the range of about 1.5 to about 2.5 seconds.

109. A process according to claim 2 wherein the ratio of average catalyst residence time to vapor residence time is in the range of about 1 to about 5.

110. A process according to claim 2 wherein the ratio of average catalyst residence time to vapor residence time is in the range of about 1 to about 4.

111. A process according to claim 2 wherein the ratio of average catalyst residence time to vapor residence time is in the range of about 1.2 to about 3.

112. A process according to claim 2 wherein the ratio of average catalyst residence time to vapor residence time is in the range of about 1.2 to about 2.

113. A process according to claim 2 wherein said catalyst is contacted with said converter feed in said elongated reaction zone in a weight ratio of catalyst to converter feed in the range of about 3 to about 18.

114. A process according to claim 2 in which said catalyst is maintained in contact with said converter feed in said elongated reaction zone in a weight ratio of catalyst to converter feed in the range of about 4 to about 12.

115. A process according to claim 2 in which said catalyst is maintained in contact with said converter feed in said elongated reaction zone in a weight ratio of catalyst to converter feed in the range of about 5 to about 10.

116. A process according to claim 2 in which said catalyst is maintained in contact with said converter feed in said elongated reaction zone in a weight ratio of catalyst to converter feed in the range of about 6 to about 10.

117. A process according to claim 2 in which said catalyst is maintained in contact with said converter feed in said elongated reaction zone in a weight ratio of catalyst to converter feed in the range of about 6 to about 8.

118. A process according to claim 2 wherein said catalyst and converter feed are brought together in sufficient amounts so that the weight ratio of said catalyst to converter feed in said elongated reaction chamber is at least about 6.

119. A process according to claim 2 wherein said reactor is a riser type reactor.

120. A process according to claim 2 wherein said reactor is a vented riser type reactor.

121. A process according to claim 2 in which said catalyst regenerating step reduces the carbon on the catalyst to about 0.1% by weight or less.

122. A process according to claim 2 wherein the catalyst is regenerated to a carbon content of about 0.05% or less.

123. A process according to claim 2 wherein the catalyst is regenerated to a carbon content of about 0.025% or less.

124. A process according to claim 2 wherein the catalyst is regenerated to a carbon content of about 0.01% or less.

125. A process according to claim 2 wherein said regeneration is conducted at a temperature in the range of about 1,100° F. to about 1,600° F.

126. A process according to claim 2 wherein said regeneration is conducted at a temperature in the range of about 1,200° F. to about 1,500° F.

127. A process according to claim 2 wherein said regeneration is conducted at a temperature in the range of about 1,275° F. to about 1,500° F.

128. A process according to claim 2 in which the amount of combustion supporting gas supplied to the regeneration operation as a whole is less than the stoichiometric amount which would be required to burn all of the carbon in the coke to $CO_2$, to burn all of the hydrogen in the coke to $H_2O$ and to burn any other combustibles which may be present in the coke to their respective combustion products.

129. A process according to claim 3 in which the combined mole percent of free oxygen in all gases resulting from the entire, completed combustion of coke in the regeneration operation is restricted to an amount substantially less than 2%.

130. A process according to claim 129 in which the free oxygen content of said combustion gases is restricted to about 0.2% or less.

131. A process according to claim 129 in which the free oxygen content of said combustion gases is restricted to about 0.1% or less.

132. A process according to claim 2 wherein the $CO:CO_2$ molar ratio of the combustion product gases formed from the burning of at least the major portion of the coke is maintained at a level of at least about 0.3 while such gases are in heat exchange contact with the catalyst.

133. A process according to claim 2 wherein the $CO:CO_2$ molar ratio of the combustion product gases formed from the burning of at least the major portion of the coke is maintained at a level of at least about 1 while such gases are in heat exchange contact with the catalyst.

134. A process according to claim 2 wherein the $CO:CO_2$ molar ratio of the combustion product gases formed from the burning of at least the major portion of the coke is maintained at a level of at least about 1.5 while such gases are in heat exchange contact with the catalyst.

135. A process according to claim 3 in which said separating of catalyst from product vapors includes abruptly separating catalyst from product vapors at the downstream end of said elongated reaction chamber, discharging the catalyst thus separated into a catalyst collection chamber, and preventing at least about 50% by volume of the total feed and product vapors which have passed through said elongated reaction chamber from having further contact with the thus separated catalyst in said catalyst collection chamber.

136. A process according to claim 135 in which said percentage of vapors prevented from further contact with catalyst in the catalyst collection chamber is at least about 80%.

137. A process according to claim 135 in which said percentage of vapors prevented from further contact with catalyst in the catalyst collection chamber is at least about 90%.

138. A process according to claim 135 wherein substantially all of said vapors are prevented from further contact with catalyst in the catalyst collection chamber.

139. A process according to claim 2 wherein said stripping is conducted at a temperature of about 1,025° F. or higher.

140. The process of claim 27 in which said water contains less than 25 ppm sodium, and at least about 2,000 ppm combined of nickel and vanadium is deposited on the catalyst.

141. A process according to claim 3 wherein the ratio of the partial pressure of said additional material, including water, relative to the partial pressure of the feed in said resultant stream is at least about 0.8 and said vapor residence time is about 2.5 seconds or less.

142. A process according to claim 2 wherein the ratio of the partial pressure of said additional material, including water, relative to the partial pressure of the feed in said resultant stream is at least about 1 and said vapor residence time is about 2 seconds or less.

143. A process according to claim 2 in which said reaction chamber outlet temperature is in the range of about 900° to about 1,200° F. and in which said resultant stream flows through said reactor at a lineal velocity of at least about 55 feet per second.

144. A process according to claim 2 wherein sufficient coke is burned during regeneration to reduce the weight of carbon on catalyst to about 0.1% or less while limiting the amount of combustion-supporting gas supplied to the regeneration operation as a whole to less than the stoichiometric amount which would be required to burn all of the carbon in the coke to $CO_2$, to burn all of the hydrogen in the coke to $H_2O$ and to burn any other combustibles which may be present in the coke to their respective combustion products, and restricting the total free oxygen mole percent of all gases resulting from the entire, complete combustion of coke in said regeneration operation to an amount substantially less than 2%.

145. A process according to claim 2 wherein sufficient coke is burned during regeneration to reduce the weight of carbon on catalyst to about 0.05% or less while limiting the amount of combustion-supporting gas supplied to the regeneration operation as a whole to less than the stoichiometric amount which would be required to burn all of the carbon in the coke to $CO_2$, to burn all of the hydrogen in the coke to $H_2O$ and to burn any other combustibles which may be present in the coke to their respective combustion products, and restricting the total free oxygen mole percent of all gases resulting from the entire, complete combustion of coke in said regeneration operation to an amount substantially less than 0.2%.

146. A process according to claim 2 wherein said regenerated catalyst is stripped with an inert gas prior to being recycled to the reactor for contact with fresh feed.

147. A process according to claim 3 in which said reaction chamber outlet temperature is greater than about 900° F. and less than about 1,200° F.

148. A process according to claim 2 wherein said reactor comprises a riser and said resultant stream flows through said riser at a lineal velocity of at least about 55 feet per second.

149. A process according to claim 2 wherein said reactor comprises a riser and said resultant stream flows through said riser at a lineal velocity of at least about 75 feet per second.

150. A process according to claim 2 wherein the concentration of cracking catalyst in said resultant stream is maintained below about 5 pounds per cubic foot.

151. A process according to claim 27 in which said cracking catalyst bears an accumulation of at least about 2,000 ppm combined of nickel and vanadium expressed as weight of metal(s) on regenerated equilibrium catalyst.

152. A process according to claim 2 wherein said converter feed contains up to about 200 ppm combined of nickel and vanadium.

153. A process according to any of claims 2, 3, 4, 5, 27, 29 or 1 wherein said water contains from 500 to 5,000 ppm hydrogen sulfide.

* * * * *